(12) United States Patent
Toyoda

(10) Patent No.: US 7,471,312 B2
(45) Date of Patent: Dec. 30, 2008

(54) PRINTING SYSTEM, IMAGE OPERATING SYSTEM, PRINTING METHOD, AND STORAGE MEDIUM

(75) Inventor: Tetsuya Toyoda, Tokyo (JP)

(73) Assignee: Olympus Corporation, Tokyo (JP)

(*) Notice: Subject to any disclaimer, the term of this patent is extended or adjusted under 35 U.S.C. 154(b) by 463 days.

(21) Appl. No.: 10/314,828

(22) Filed: Dec. 9, 2002

(65) Prior Publication Data

US 2003/0146978 A1 Aug. 7, 2003

(30) Foreign Application Priority Data

Dec. 19, 2001 (JP) .............................. 2001-386664

(51) Int. Cl.
H04N 5/225 (2006.01)

(52) U.S. Cl. ................................ 348/207.2; 348/222.1

(58) Field of Classification Search ............. 348/207.1, 348/207.2, 222.01, 231.6, 222.1
See application file for complete search history.

(56) References Cited

U.S. PATENT DOCUMENTS

| | | | |
|---|---|---|---|
| 6,111,605 A * | 8/2000 | Suzuki | 348/220.1 |
| 2001/0019416 A1* | 9/2001 | Monty et al. | 358/1.9 |
| 2001/0053247 A1* | 12/2001 | Sowinski et al. | 382/162 |
| 2006/0078230 A1* | 4/2006 | Kimura | 382/309 |

FOREIGN PATENT DOCUMENTS

| | | |
|---|---|---|
| JP | 10-200671 | 7/1998 |
| JP | 11-239269 | 8/1999 |
| JP | 2001-223979 | 8/2001 |

OTHER PUBLICATIONS

Notice of Rejection Ground for corresponding Japanese Patent Application No. 2001-386664, mailed Aug. 21, 2007 (3 pgs.) with translation (1 pg.).

* cited by examiner

*Primary Examiner*—Tuan V Ho
(74) *Attorney, Agent, or Firm*—Straub and Pokotylo; John C. Pokotylo

(57) ABSTRACT

A printing system includes: a camera unit for performing an electro-optic conversion on an image from a subject, generating image data storable in a storage unit, and storing print instruction information as associated with the image data according to the capture information relating to the capture of the image; an image editing unit for performing image editing on the image data; an information rewriting unit for rewriting the print instruction information stored as associated with the image data corresponding to the contents of image editing by the image editing unit; and a printing unit for performing a printing process after performing a predetermined image processing on the image data corresponding to the print instruction information.

45 Claims, 20 Drawing Sheets

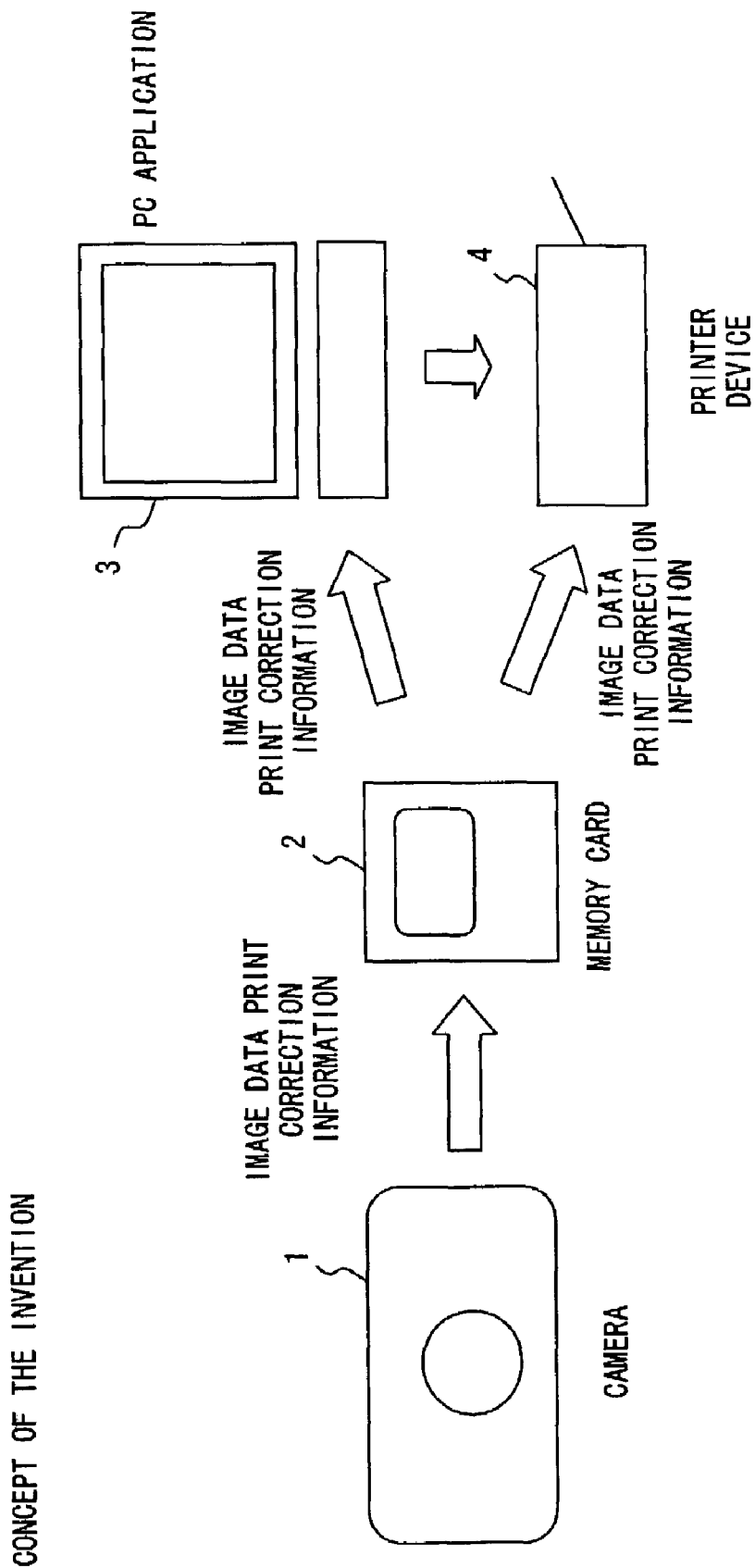

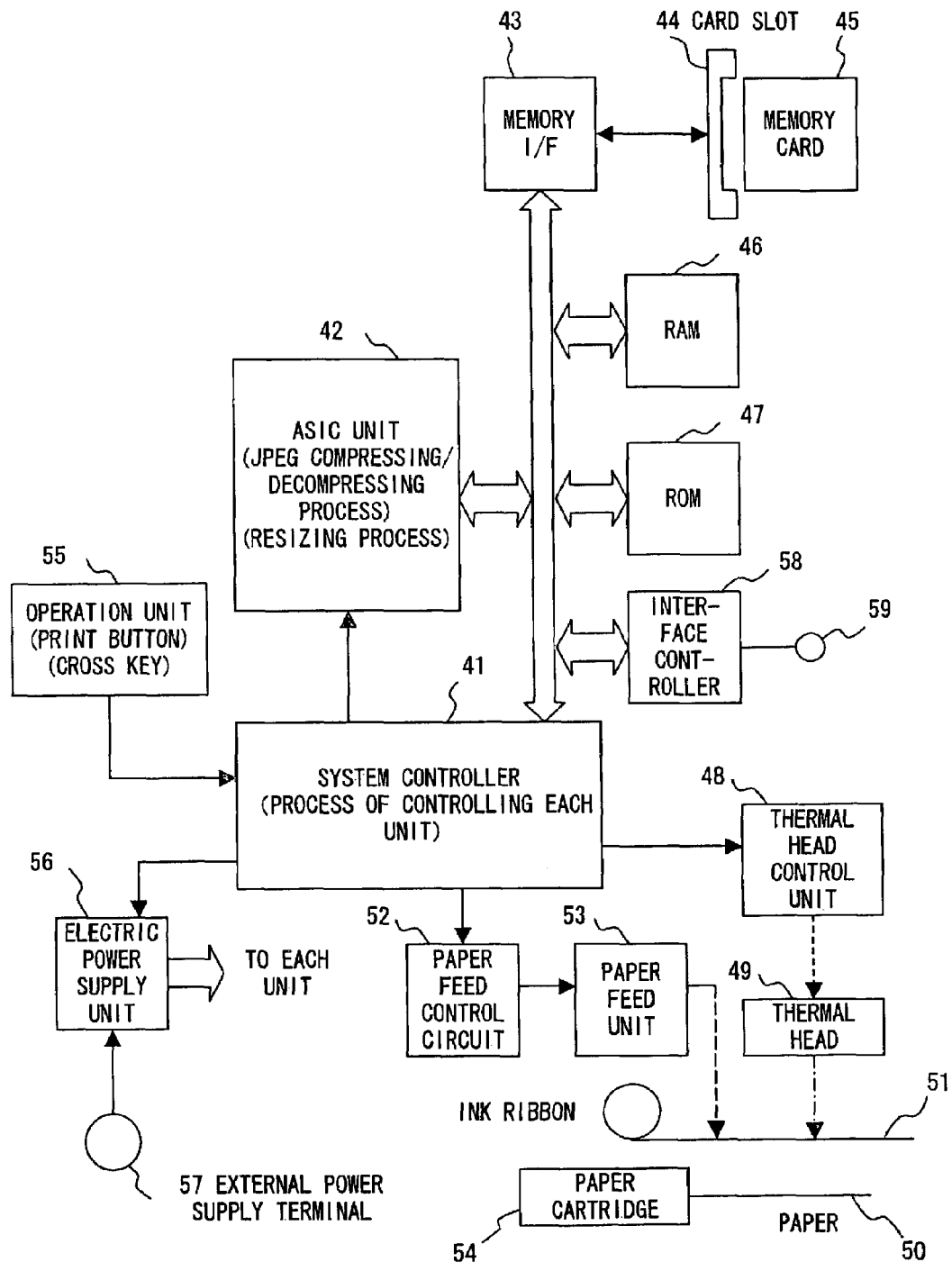
F I G. 3

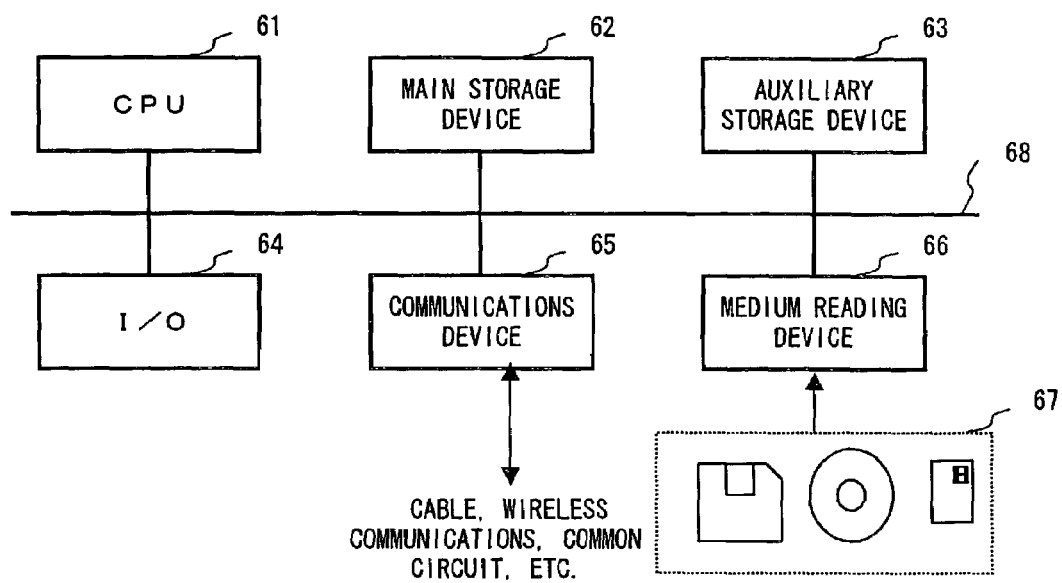
F I G. 4

| | | PRINT CORRECTION PARAMETER | | | | | | |
|---|---|---|---|---|---|---|---|---|
| | | BRIGHT-NESS | CONT-RAST | WHITE BALANCE | CHROMA | SHARP-NESS | NOISE REDUCTION | JAGGY PROCESS |
| CAPTURE CONDITION INFORMATION | EXPOSURE MODE | AUTOMATIC | | | | | | |
| | | MANUAL × | | | | | | |
| | PHOTOMETRIC MODE | AUTOMATIC | | | | | | |
| | | SPOT × | | | | | | |
| | EXPOSURE CORRECTION | WITHOUT CORRECTION | | | | | | |
| | | WITH CORRECTION × | | | | | | |
| | WHITE BALANCE | AUTOMATIC | | | | | | |
| | | MANUAL | | × | | | | |
| | STROBE LIGHT | EMISSION | | LOWER VALUE | | | | |
| | | NO EMISSION YET | | | | | | |
| | SCENE MODE | PORTRAIT | | LOWER VALUE | | | | |
| | | LANDSCAPE | | | HIGHER VALUE | | | |
| | | SPORTS | | | | HIGHER VALUE | | |
| | CONTRAST | STANDARD | | | | | | |
| | | HIGH | × | | | | | |
| | | LOW | × | | | | | |
| | CHROMA | STANDARD | | | | | | |
| | | HIGH | | | × | | | |
| | | LOW | | | × | | | |
| | SHARPNESS | STANDARD | | | | | | |
| | | HIGH | | | | × | | |
| | | LOW | | | | × | | |
| | ISO SENSITIVITY | WITHOUT INCREASE | | | | | | |
| | | WITH INCREASE | | | | | × | |
| | DIGITAL ZOOM | NONE | | | | | | |
| | | AVAILABLE | | | | × | | O |

O  TO BE PERFORMED IF THIS ITEM IS SET REGARDLESS OF OTHER CAPTURE CONDITIONS

×  NOT TO BE PERFORMED IF THIS ITEM IS SET REGARDLESS OF OTHER CAPTURE CONDITIONS

BLANK  TO BE PERFORMED WHEN THERE IS NO × ITEMS

LOWER VALUE  TO BE PERFORMED WHEN THERE IS NO × ITEMS

HIGHER VALUE  TO BE PERFORMED WHEN THERE IS NO × ITEMS

F I G. 5

|  | | PRINT CORRENCTION PARAMETER | | | | | | |
|---|---|---|---|---|---|---|---|---|
|  | | BRIGHTNESS | CONTRAST | WHITE BALALNCE | CHROMA | SHARPNESS | NOISE REDUCTION | JAGGY PROCESS |
| IMAGE EDITING CONTENTS | BRITNESS | × | × | | | | | |
| | CONTRAST | × | × | | | | | |
| | COLOR BALANCE | | | × | × | | | |
| | CHROMA | | | × | × | | | |
| | SHARPNESS | | | | | × | × | |
| | TRIMMING | | | | | | | ○ |
| | TEMPLATE SYNTHESIS | | | | | | | |

○   TO BE PERFORMED IF THIS ITEM IS SET REGARDLESS OF OTHER CAPTURE CONDITIONS

×   NOT TO BE PERFORMED IF THIS ITEM IS SET REGARDLESS OF OTHER CAPTURE CONDITIONS

BLANK   TO BE PERFORMED WHEN THERE IS NO × ITEMS

LOWER VALUE   TO BE PERFORMED WHEN THERE IS NO × ITEMS

HIGHER VALUE   TO BE PERFORMED WHEN THERE IS NO × ITEMS

F I G. 6

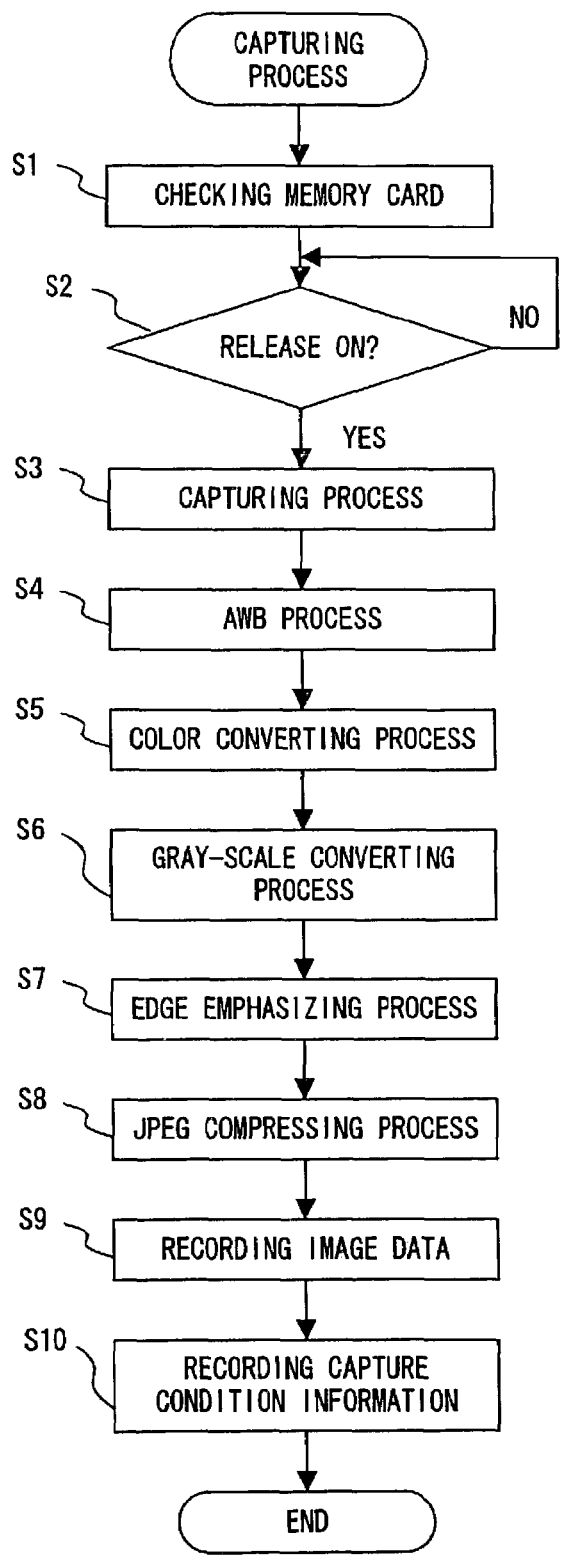
F I G. 7

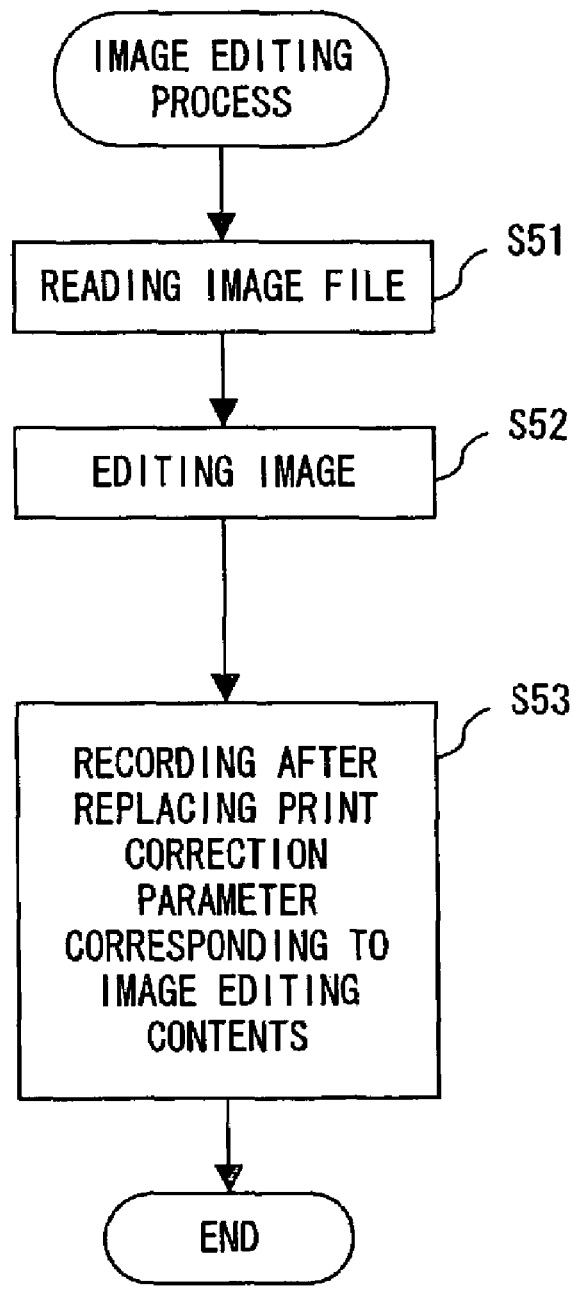
F I G. 1 2

| IMAGE EDITING CONTENTS | CAPTURE CONDITION INFORMATION | | | | | | | | | | |
|---|---|---|---|---|---|---|---|---|---|---|---|
| | EXPOSURE MODE | PHOTO-METRIC MODE | EX-POSURE CORRE-CTION | WHITE BALANCE | STROBE LIGHT | SCENE MODE | CON-TRAST | CHROMA | SHARPNESS | ISO SEN-SITIVITY | DIGITAL ZOOM |
| BRIGHTNESS | MANUAL | | | | | | | | | | |
| CONTRAST | | | | | NO EMISSION YET | | STAN-DARD | | | IMPROVED SENSITIV-ITY(*) | |
| COLOR BALANCE | | | | MANUAL | | | | | | | |
| CHROMA | | | | | | | | STAN-DARED | | IMPROVED SENSITIV-ITY(*) | |
| SHARPNESS | | | | | | | | | STANDARD | IMPROVED SENSITIV-ITY(*) | |
| TRIMMING | | | | | | | | | | | MAGNIFI-CATION (**) |
| TEMPLATE SYNTHESIS | | | | | | | | | | | |

(*) "IMPROVED SENSITIVITY" IS OBTAINED WHEN PROCESS AT PREDETERMINED LEVEL OR MORE IS PERFORMED
(BECAUSE NOISE IS EMPHASIZED AND RECOGNIZED AS CAPTURE WITH INCREASED SENSITIVITY WHEN CONTRAST, CHROMA, ETC. IS IMPROVED BY PREDETERMINED LEVEL OR MORE)

(**) RECORDING PRODUCT OBTAINED BY MULTIPLYING DIGITAL ZOOM MAGNIFICATION DURING IMAGE CAPTURING BY TRIMMING MAGNIFICATION

F I G. 1 3

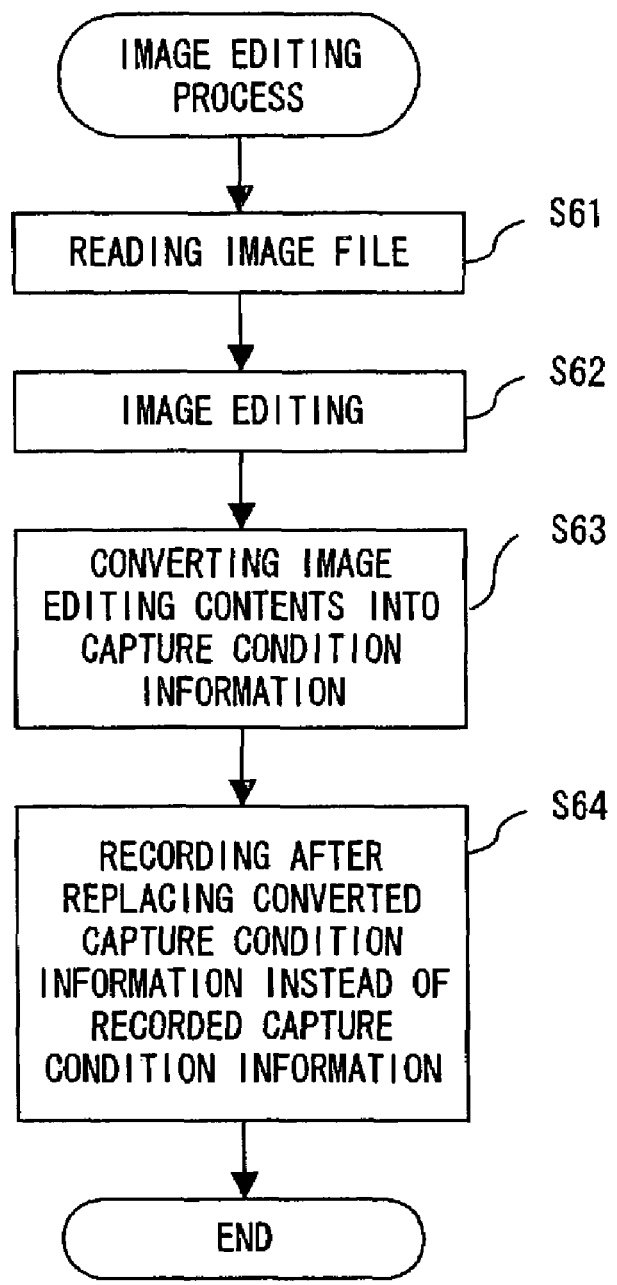
F I G. 1 4

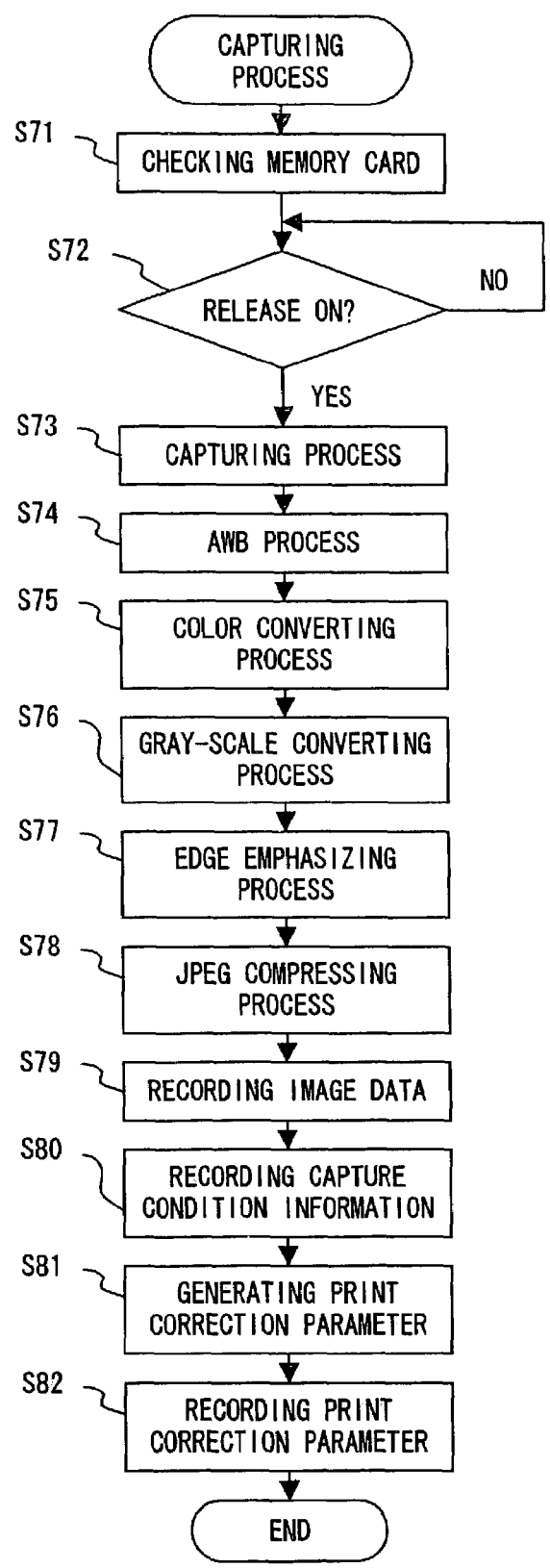
F I G. 1 5

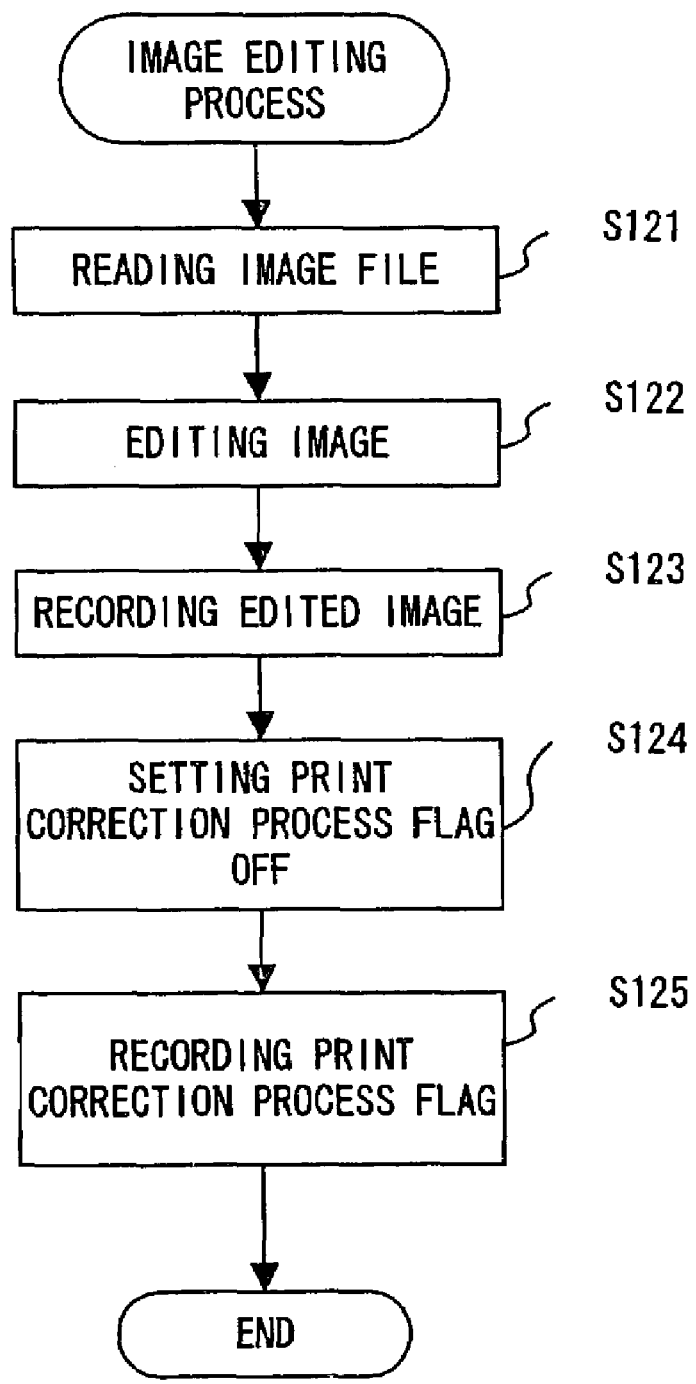
F I G. 1 8

PRINTING SYSTEM, IMAGE OPERATING SYSTEM, PRINTING METHOD, AND STORAGE MEDIUM

BACKGROUND OF THE INVENTION

1. Field of the Invention

The present invention relates to an image processing device for performing an image editing process on image data obtained by a digital camera, and a printing system for printing the image data obtained by performing an image editing process.

2. Description of the Related Art

Recently, what is called a digital camera has been widely used in capturing an image using an image pickup device such as a charge-coupled device (CCD), etc.

The image data of an image captured by the digital camera can be easily transmitted and treated in an image processing operation. For example, when a captured image is a portrait, it can be finished as a soft image (in a portrait mode) in image processing. When the image is a landscape picture, it can also be reproduced with a subject with higher chroma in vivid color (in a landscape mode), when the image is for a quick moving object such as sporting motion, etc., it is processed with contrast enhancement for higher clearness of the image (in a sport mode), etc. in image processing.

In the image processing, an image can be printed with the emphasized beauty of a picture.

The above mentioned technology of image processing for image data is disclosed by, for example, the 'Image Processing Method' of Japanese Patent Publication No. Hei 11-239269.

The technology described in the publication discloses the method of stably outputting a high quality image reproduced as a printed image by assigning scene information obtained during image capturing to image data, and setting the optimum image processing condition depending on the scene information in the digital image processing during printing.

Another technology of image processing on image data is disclosed by the 'Image Forming Apparatus, Displaying Method, and Storage Medium therefor' of Japanese Patent Publication No. Hei 10-200671.

The technology in the publication discloses the method of outputting a user-desired image by recording the finishing information about a film such as a soft focus, a soft finishing instruction, etc. on the magnetic track of the film, and performing image processing according to the finishing information during printing.

In these above mentioned technologies, information about the type of the capture scene with which the image is captured is added to the image data, and the image processing is performed according to the information about the type of the capture scene assigned to the image data in many cases. For example, as disclosed in Japanese Patent Publication No. Hei 11-239269, scene information is assigned to image data, and the image is printed during printing, etc. after automatically performing desired image processing according to the scene information by a printer device, thereby automatically printing a beautiful photo. Similarly, in the technology of Japanese Patent Publication No. Hei 10-200671, an image is printed after performing the image processing according to the finishing information about the process on image data.

Also popularized recently is application software for image processing capable of fetching image data captured by a digital camera into a general-purpose computer (hereinafter referred to as a PC) such as a personal computer, etc., and freely adjusting each parameter in an arbitrary degree of the brightness, chroma, color balance, etc. of the fetched image data. Using the image processing software, a captured image can be treated in a fine adjusting process while being displayed on the PC monitor, thereby generating a user-desired image.

Additionally, in printing a captured image, as described above, the contents of the desired image processing depend on the type of the scene of a captured image in many cases. Therefore, the mode information (a portrait mode, a landscape mode, a sports mode, etc.) during image capturing by a camera is recorded after adding it to captured image data, the mode information is read during printing and treated in image processing depending on each mode, and then printed, thereby realizing a very useful system capable of automatically obtaining a beautiful printed picture.

However, when image data obtained by adding the scene information to a captured image is fetched to a PC, a desired adjustment, process, etc. are performed on the data, and the processed image data is to be printed on a printer device, and if the printer device is configured to print the image by automatically reading mode information and printing after performing corresponding image processing, then, although the image data is processed such that the optimum image can be obtained for printing such as a process of improving the chroma by performing image processing on a PC, a process of performing contrast enhancement. etc., the printer device performs the printing process with further image processing of performing chroma or contrast enhancement, etc. on the image data. As a result, an image different from the user-desired image such as an excessively chroma or contrast improved image, etc. is printed, thereby failing in obtaining a printed image of a desired quality.

To avoid the above mentioned case, it is possible for a user to determine whether or not image processing is performed by a printer device, etc. for performing the printing process each time the printing process is performed, which is a very bothersome operation for the user, though.

SUMMARY OF THE INVENTION

The present invention aims at providing an image processing device, a printing system, a printing method, and a storage medium capable of obtaining a printed image in a desired state without a user's additional operation on the image data of a captured image.

The printing system according to the present invention includes a camera unit, an image editing unit, an information rewriting unit, and a printing unit.

The camera unit performs an electro-optic conversion on an image from a subject, generates image data storable in the storage unit, and stores print instruction information associated with the image data according to capture information relating to the capture of the image.

The image editing unit performs image editing on the image data.

The information rewriting unit rewrites the print instruction information stored in association with the image data corresponding to the contents of the image editing by the image editing unit.

The printing unit performs a printing process after performing a predetermined image processing on the image data corresponding to the print instruction information.

The printing system according to the present invention can also be configured to include a storage unit for storing image data processed in image editing by the image editing unit associated with the print instruction information rewritten by the information rewriting unit corresponding to the contents of the image editing of the image editing unit.

The image processing device according to the present invention also includes: an image editing unit for performing image editing on image data storable in a storage unit after being obtained by performing an electro-optic conversion on an image from a subject; and an information rewriting unit for rewriting print instruction information according to capture information relating to the capture of the image data stored in association with the image data corresponding to the contents of the image editing by the image editing unit.

According to the present invention, the print instruction information stored in association with the image data is rewritten by the information rewriting unit according to the contents of the image editing performed by the image editing unit and the image is amended according to the print instruction information. Therefore, an image amendment can be made based on the contents of the image editing.

BRIEF DESCRIPTION OF THE DRAWINGS

FIG. 1 shows the concept of the entire flow of an embodiment of the present invention;

FIG. 3 is a block diagram of the configuration of a printer device;

FIG. 4 shows the basic configuration of a PC;

FIG. 5 shows a capture condition information—printer correction parameter conversion table.

FIG. 6 shows an image edition contents information—printer correction parameter conversion table;

FIG. 7 is a flowchart of the capturing process according to the first embodiment of the present invention;

FIG. 12 is a flowchart of the image editing process according to the second embodiment of the present invention;

FIG. 13 is a table showing the correspondence between the image editing contents and the capture condition information;

FIG. 14 is a flowchart of the image editing process according to the third embodiment of the present invention;

FIG. 15 is a flowchart of the capturing process according to the fourth embodiment of the present invention;

FIG. 18 is a flowchart of the image editing process according to the fifth embodiment of the present invention;

DESCRIPTION OF THE PREFERRED EMBODIMENT

Basic Principle

FIG. 1 shows the concept of the entire flow of an embodiment of the present embodiment.

In the printing system according to an embodiment of the present invention, the image processing device performs image processing on the image data of the image captured by a digital camera 1, and a printer device 4 prints the processed image data. At this time, the image processing device generates print correction information used during printing with the contents of the image correction and the information assigned to the image data taken into account. Then, the printer device 4 prints the image data by performing the image processing according to the print correction information. Thus, although any image processing has been performed on the image data after it is captured, a user-desired printed image can be obtained.

The image processing device according to an embodiment of the present invention can be configured as an image processing device 3 independent of the digital camera 1 and the printer device 4, or can be realized as an appliance incorporated into the digital camera 1 or the printer device 4 or an appliance added as an option. The image processing device 3 can be realized as an appliance exclusive for the image editing process or can be realized as functioning in a sense of software by operating an application program on a PC.

The image data captured by the digital camera 1 is stored in a memory card 2, and transmitted to the image processing device 3 or the printer device 4 using the memory card 2. According to the present embodiment, the transmission/reception of data among appliances is not performed only by the memory card 2, but can be performed by any of other portable storage media. Otherwise, the appliances can be connected through a cable so that data can be transferred through the cable or through wireless communications.

Figure 2:
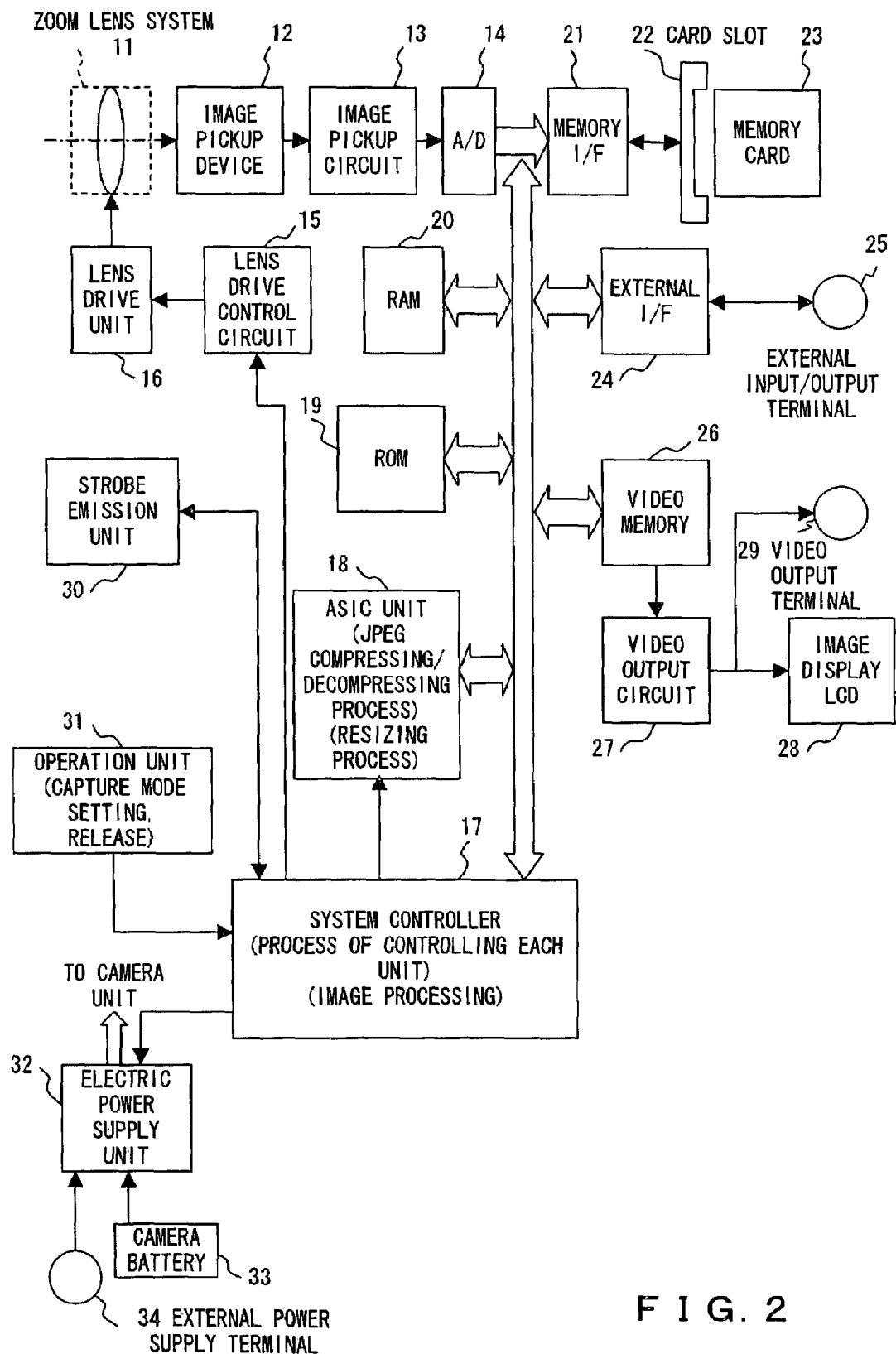
FIG. 2 is a block diagram of the configuration of an electronic camera.

FIGS. 2 and 3 are block diagrams showing examples of the configuration of the digital camera 1 and the printer device 4 contained in the printing system according to an embodiment of the present invention. The electronic camera shown in FIG. 2 has the function of enabling an image to be captured in a scene mode set by a user (who captures the image). The printer device shown in FIG. 3 has the function of enabling a printing process to be performed by performing a correcting process according to the print correction information added to image data to be printed.

First, the configuration of an electronic camera is described by referring to FIG. 2.

In FIG. 2, an image pickup unit is configured by a zoom lens system 11, an image pickup device 12, an image pickup circuit 13, and an A/D (analog/digital) conversion circuit 14. In the image pickup unit, an electro-optic conversion is performed by the image pickup device 12 on a subject image formed by the zoom lens system 11, and an image signal which is a conversion output is input to the A/D conversion circuit 14 through the image pickup circuit 13 to be A/D converted, thereby obtaining image data which is digital data. The lens provided for the zoom lens system 11 is driven by a lens drive unit 16 controlled by a lens drive control circuit 15, and a focus adjustment is performed on the subject image.

A system controller 17 is provided with a CPU (central processing unit), controls each unit configuring an electronic camera, and performs various types of image processing of correcting the variations of light and shade, chroma, a hue, etc. of an image-displayed by image data.

An ASIC (Application Specific Integrated Circuit) unit 18 performs a compressing process and a decompressing process on the image data in the JPEG (Joint Photographic Experts Group) format.

ROM 19 is a read only memory storing a control program, for allowing the CPU provided for the system controller 17 to perform the control of each unit forming part of an electronic camera, arithmetic data required in each type of process, a capture condition information—printer correction parameter conversion table, an image edition contents information—printer correction parameter conversion table, etc. described later.

RAM 20 is random access memory for use as buffer memory for temporarily storing image data and as a work storage area for use in each type of process by the system controller 17.

A memory I/F (interface) 21 provides an interface for transmitting and receiving data to and from a memory card 23 inserted into a card slot 22, and performs processes of writing an image file (including image data) to the memory card 23 configured by comprising semiconductor memory which can read and write data, or reading an image file (including image data) from the memory card 23.

An external I/F (interface) 24 provides the function of an interface for transmitting and receiving data to and from an external device connected to an external input/output terminal 25, for example, a personal computer, etc., outputs an image file (including image data), various data, etc. to an external device, and inputs an image file (including image data), various data, etc. from an external device.

Video memory 26 temporarily stores displaying image data obtained in the image processing by the system controller 17. The image data is then read from the video memory 26, input into a video output circuit 27, and converted into an image signal which is a video signal. When the image signal is input into an image display LCD 28, an image is displayed. The image signal can also be transmitted to another device through a video output terminal 29.

A strobe emission unit 30 emits strobe light when an image is captured using the strobe light.

An operation unit 31 has various buttons (including a release button) and a switch, etc. for reception of each instruction from a user (who captures the image) such as an additional function setting instruction, a capture instruction, etc. other than the main function for capturing an image such as a scene mode instruction, a sensitivity information increment setting, etc., and transmits a received instruction to the system controller 17.

An electric power supply unit 32 controls the voltage of a camera battery 33 or the voltage of electric power received by an external power supply terminal 34, and provides the electric power to each unit of the electronic camera.

The configuration of the printer device is described below by referring to FIG. 3. The printer device shown in FIG. 3 uses an ink ribbon formed by, for example, Y (yellow), M (magenta), and C (cyan), and is a printer device in a sublimation type thermal transfer system for printing data onto paper in a surface conjunct method.

In FIG. 3, a system controller 41 is provided with a CPU (central processing unit), controls each unit configuring a printer device, analyzes image data, and automatically performs each type of image processing for correcting the variations of light and shade, chroma, a hue, etc. of an image based on the analysis result.

An ASIC (Application Specific Integrated Circuit) unit 42 performs a compressing process and a decompressing process on image data in the JPEG (joint photographic experts group) format.

A memory I/F (interface) 43 provides the function of an interface for transmitting and receiving data to and from a memory card 45 inserted into a card slot 44, writes an information (including image data) to the memory card 45 configured by comprising data writable/readable semiconductor memory, or read an image file (including image data) from the memory card 45.

RAM 46 is a random access memory for use as buffer memory for temporarily storing image data, and is also used as a work storage area in various processes by the system controller 41.

ROM 47 is a read only memory storing a control program for allowing the CPU provided for the system controller 41 to control each unit forming part of a printer device and arithmetic data required in various processes, etc..

A thermal head control unit 48 reads printing image data obtained in various image processing such as an automatically image quality correcting process, etc. by the system controller 41 for each 1-line data, and drives (heats) a thermal head 49 based on the read data, thereby performing a printing process by sublimating and absorbing the dyestuffs of a ink ribbon 51 onto paper 50. A paper feed control circuit 52 controls a paper feed unit 53 and feeds paper 50 from a paper cartridge 54 corresponding to sequential application of each ink such that an overlap printing can be performed using the ink ribbon 51 of Y, M, and C.

An operation unit 55 has various buttons, switches, etc. for reception of various instructions form a user such as an image selection instruction, a printing instruction, etc., and transmits a received instruction to the system controller 41. For example, it can be an electric supply switch, a print button, a cross key, etc.

An electric power supply unit 56 controls the voltage of the electric power input to an external power supply terminal 57, and provides electric power to each unit comprising part of the printer device.

An interface controller 58 controls reception of image data transferred from a cable connected to a connector 59. The interface controller 58 performs control based on the communications protocol such as USB, IEEE1394, etc., and communicates data with the digital camera 1 and the image processing device 3 through a cable connect to the connector 59.

FIG. 4 shows the basic configuration of a PC when the image processing device 3 is realized by operating an application program on a PC.

In FIG. 4, a PC comprises a CPU 61, a main storage device 62, an auxiliary storage device 63 such as a hard disk, etc., an input/output device (I/O) 64 such as a display, a keyboard, etc., a communications device 65 such as a modem, etc., and a medium reading device 66 for reading storage contents from a portable storage medium 67 such as a memory card, a flexible disk, CD-ROM, an MO, a magnetic tap, etc. These components are interconnected through a bus 68.

With the configuration shown in FIG. 4, the medium reading device 66 reads a program and data stored in the portable storage medium 67, and downloads them into the main storage device 62 and/or the auxiliary storage device 63. Then, each process as the image processing device 3 can be realized in a sense of software by the CPU 61 performing a process based on the program and data.

When image processing is performed, the PC shown in FIG. 4 reads image data by the medium reading device 66 from the portable storage medium 67 such as a memory card, etc., by the communications device 65 from the digital camera 1, or by a common circuit such as Internet, etc., displays the read image data on a display, etc., performs image processing at an instruction from a user, and records the result as image data in the portable storage medium 67 or the auxiliary storage device 63. At this time, the print correction information generated according to the contents of the image processing by the user and the capture condition information associated with the image data, is associated with the image data treated in the image processing, for example, associated with the same image file, or associated in the method of associating using a file name, etc.

Then, the image data is transferred to the printer device 4 through the portable storage medium 67 or using a cable, wireless communications, a common circuit, etc. from the communications device 65.

Then, described below are the practical processes performed when an image is captured, when an image editing process is performed, and during printing.

First Embodiment

With any of the digital camera 1, the image processing device 3, and the printer device 4, the first embodiment, only the capture condition information indicating the capture condition, etc. set by a user during image capturing, and the image editing contents information indicating the contents of the image processing operation performed on the image data are associated with the image data and stored. Only in the printer device 4 or the image processing device 3 for outputting the final print data to the printer device 4, a print correction parameter is generated according to the capture condition information indicating the scene mode, etc. or the image editing contents information indicating the contents of the process performed in the image processing. Then, the printer device 4 performs the correcting process on the image data according to the print correction parameter, and then prints the data. In the printer device 4, the print correction parameter is used for image correction on the image data based on the characteristic of the ink, the specifications specific to the printer device 4, etc. before printing the image data such that the image data can be printed in the optimum state. The print correction parameter is used in placing a restriction on or issuing an instruction to each of a plurality of processes performed in the image correction.

The printer device 4 and the image processing device (the image processing device 3, or the image processing device in the digital camera 1 or the printer device 4) which outputs print data leaves the information associated with the read image data as is if it is a print correction parameter, and converts it if it is capture condition information or image editing contents information.

Described first is the case in which the capture condition information is stored as associated with the image data. In this case, the image captured by the digital camera 1 is printed without performing an image processing operation on the image by the user.

FIG. 5 is a capture condition information—printer correction parameter conversion table showing the relationship between capture condition information and a print correction parameter.

In FIG. 5, an exposure mode (automatic, manual), a photometric mode (automatic, spot), an exposure correction (with a correction, no correction), white balance (automatic, manual), strobe light (emission, no emission yet), a scene mode (portrait, landscape, sports), contrast (standard, high, low), chroma (standard, high, low), sharpness (standard, high, low), ISO sensitivity (no improvement, with improvement), a digital zoom (none, magnification) are horizontally listed as the capture condition information, and recorded with the image data captured based on the capture condition on which the user captured the image using the digital camera 1. Listed in the vertical direction are the items of the print correction parameter indicating the process contents during image processing when a printing process is actually performed by the printer device 4, that is, the brightness, contrast, white balance, chroma, sharpness, presence/absence of a noise reduction process, and presence/absence of a jaggy process of a printed image. These items are set in the image processing performed during printing, and the printer device 4 performs the image processing on the image data based on the print correction parameter, thereby performing the printing process.

The items of the capture condition information and the print correction parameter listed in FIG. 5 are examples, and the items depend on the specifications of the digital camera 1 and the printer device 4. Additionally, new items of the capture condition information and the print correction parameter can be added or any of the items can be deleted in consideration of the compatibility of data between the digital camera 1 and the printer device 4. Otherwise, a quite different configuration can be set.

The capture condition information—printer correction parameter conversion table prescribes the setting restrictions on the print correction parameter set based on the set value in the capture condition information and the process execution instructions in the image processing performed by the printer device 4 during printing. In FIG. 5, on the capture condition information—printer correction parameter conversion table, the restriction contents (in FIG. 5, 'O': setting the print correction parameter for process execution regardless of other capture condition conditions when the current item is set, 'X': setting the print correction parameter not for process execution regardless of other capture condition conditions when the current item is set, blank column, higher value, lower value: an execution instruction to correct for arbitrary, higher, and lower values for the print correction parameter when 'X' is not marked for other items of the capture condition information) for setting the print correction. parameter listed in the vertical direction are shown for each item recorded in the capture condition information listed in the horizontal direction.

When image data is printed on the printer device 4, the print correction parameter is set for the image data so that the optimum printing process can be performed, and the printing process is performed after performing the image processing on the image data using the print correction parameter. When the print correction parameter is set, the printer device 4 determined the print correction parameter depending on the contents of the capture condition information—printer correction parameter conversion table built in the printer device 4 as shown in FIG. 5.

For example, when the digital camera 1 is used in manually capturing an image using the emission by strobe light, the capture condition information associated with the image data of the captured image includes 'emission' in the item 'strobe light', and 'manual' in the item 'exposure mode' set and recorded. Since the item 'strobe light' in the capture condition information is set with 'emission', the printer device 4 which reads the image data set the print correction parameter such that the contrast of the image data can be changed into a lower value in the process corresponding to the 'contrast' of the print correction parameter unless the item 'contrast' in the capture condition information is set with 'high' or 'low'. Furthermore, since the item 'exposure mode' in the capture condition information is set with 'manual', the print correction parameter is set such that no process can be performed on the 'brightness' of the print correction parameter. In the processes on the other items such as white balance, chroma, sharpness, a noise reduction process, a jaggy process, etc., the print correction parameter is set based on the restrictions if there are the restrictions as in the above mentioned cases of the items 'contrast' and 'exposure mode', and the print correction parameter is set such that the image processing can be performed with the contents set by default in the printer device 4 when there are no restrictions by other settings of the capture condition information. By the printing process performed after the image correction by the printer device 4 according to the print correction parameter, the user can obtain a printed image in the optimum state without issuing a special instruction for the printing process.

Described below is the case in which the image data of an image captured by the digital camera 1 is processes by the user into a desired image in the image processing operation using the image processing device (the image processing device 3, or the image processing device in the digital camera 1 or the printer device 4).

In this case, the user first operates the digital camera 1 or the printer device 4 on the image data of the captured image, or fetches the image data into the image processing device 3, arbitrarily adjusts the parameter such as brightness, chroma, contrast, etc. for generation of a desired image, performs the image processing operation such as synthesizing a template, etc., and stores the adjusted image data. At this time, the capture condition information associated with the original image data prior to the image processing operation by the image processing device is replaced with the image editing contents information, and stored as associated with the image data after the image processing operation.

When the processed image data is printed on the printer device 4, the image editing contents information associated with the image data to be printed is converted into a print correction parameter in the printer device 4, and treated in the image processing based on the print correction parameter, thereby performing the printing process. For example, if the user changes a parameter value of the brightness, contrast, chroma, etc. to obtain a desired image and performs a trimming process, etc. and then stores the image data, then the information indicating the type of image processing operation and the numerical information such as the change amount, etc. as necessary are stored with the image data.

The image editing contents information can also be configured to be generated with not only the contents of the image processing operation performed by the image processing device but also the contents of the capture condition information associated with the original image taken into account. For example, if 'manual' is set and recorded in the item 'exposure mode' in the capture condition information, then the image editing contents information stores the information similar to that in the case of changing 'brightness' in the image processing operation.

Thus, the image editing contents information is generated by adding the converted capture condition information to the information based on the image processing operation performed by the user using the image processing device, and stored as associated with the image data.

When the image data is fetched into the printer device 4 for printing, a print correction parameter is generated according to the image editing contents information, and the image processing is performed based on the print correction parameter, thereby performing a printing process.

FIG. 6 is an image edition contents information—printer correction parameter conversion table showing the relationship between the image editing contents information and the print correction parameter. The image edition contents information—printer correction parameter conversion table is used in converting the image editing contents information into a print correction parameter, and is stored in the memory such as the ROM 47, etc. in the printer device 4 according to the first embodiment.

In the image edition contents information—printer correction parameter conversion table shown in FIG. 6, items of the image editing contents information, that is, brightness, contrast, color balance, chroma, sharpness, trimming, template synthesis, are listed in the horizontal direction. The information about them are stored with the image data after the image processing operation performed by the user using the image processing device. Each item of the print correction parameter is listed in the vertical direction, and the contents of the restrictions in the vertical direction when the print correction parameter is set in relation to each item recorded in the image editing contents information displayed in the horizontal direction are displayed in the same expression as the capture condition information—printer correction parameter conversion table shown in FIG. 5.

When the printer device 4 reads image data to be printed, the associated image editing contents information is converted into a print correction parameter according to the image edition contents information—printer correction parameter conversion table.

For example, if the image editing contents information includes the information that the process of changing the parameter of the brightness of an image has been performed as an image processing operation, then the printer device 4 sets a print correction parameter such that the parameter for change of the brightness and the contrast may not be changed, based on the image edition contents information—printer correction parameter conversion table. Then, the printer device 4 performs control such that an image processing relating to the brightness and the contrast can be suppressed and cannot be performed according to the print correction parameter while controlling other items such as white balance, chroma, sharpness, a noise reduction process, a jaggy process, etc. to be set by default in the printer device 4 in the image processing, and then printing an image.

Thus, for example, when the user performs an image processing operation on the brightness, the user adjusts the image data captured by the digital camera 1 for desired brightness of image, the image is to be processed for no more correction (brightness). Therefore, the printer device 4 performs no further process of changing the brightness on the image in the image processing during printing. The capture condition information not treated by the image processing device in the image processing operation functions as the print instruction information as is during printing.

As a result, although the user has performed an image processing operation using the image processing device, the user can obtain a desired printed image on the printer device 4 without issuing a special operation instruction.

FIG. 7 is a flowchart of the capturing process performed by the digital camera 1.

When the capturing process starts, the digital camera 1 checks the available capacity of the memory card for recording a captured image in step S1.

If it is confirmed that there is an available capacity for storage of image data in the memory card, then the digital camera 1 enters a state of awaiting the pressing of a release button (NO in step S2). When the release button is pressed (YES in step S2), the capturing process is performed under each capture condition set in the digital camera 1 (step S3). Then, the digital camera 1 performs an AWB (auto-white balance) process (step S4), a color converting process (step S5), a gray-scale converting process (step S6), and an edge emphasizing process (step S7) on the captured image according to the scene mode, etc. selected and set by the user, and performs a JPEG compressing process on the image data in step S8. Then, in step S9, the image data is stored on the memory card. At this time, various conditions during image capturing, for example, a selected scene mode (portrait mode, landscape mode, etc.), the additional function setting information indicating the settings of the additional functions set in the digital camera such as the presence/absence of exposure correction (automatic, manual), the improvement of sensitivity information, etc., etc., are stored (step S10) as associated with the image data stored in step S9, thereby terminating the capturing process. Until the release button is pressed in step S2, the user can change the setting of the camera.

Figure 8:
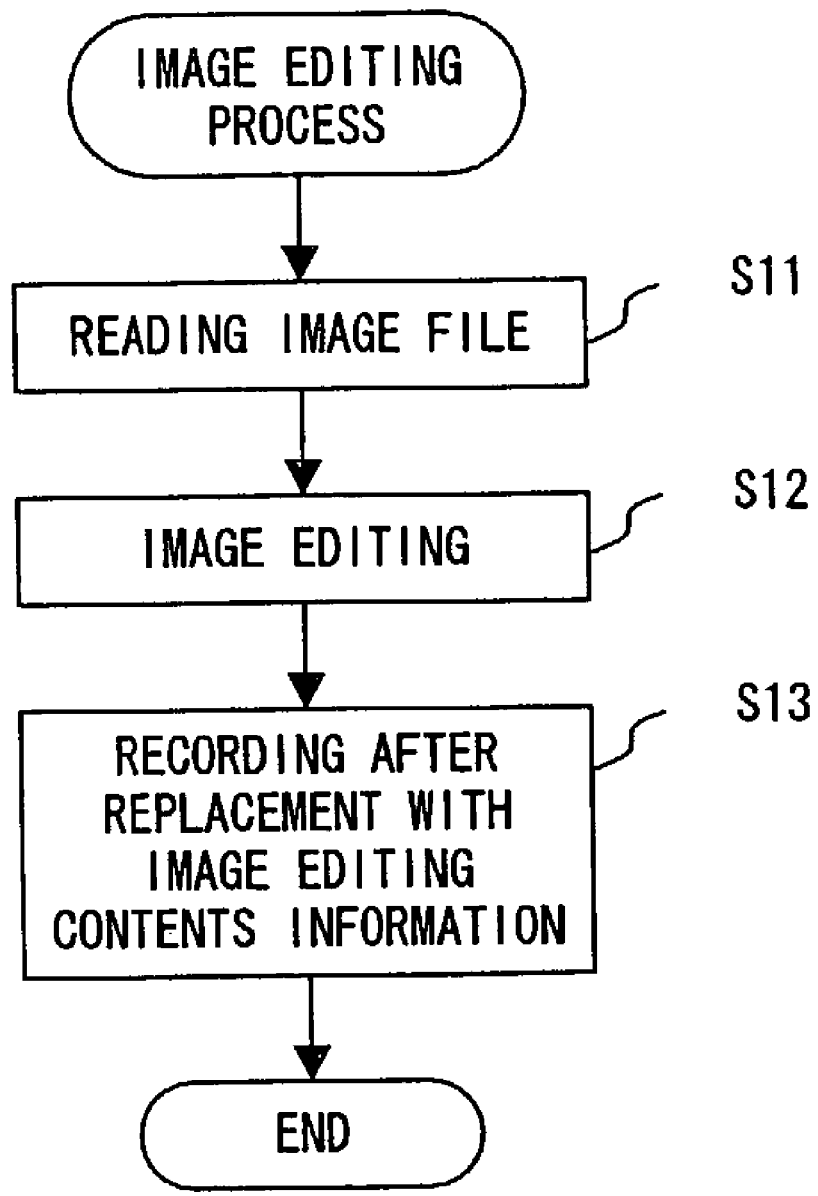
FIG. 8 is a flowchart of the image editing process according to the first embodiment of the present invention.

FIG. 8 is a flowchart of the image editing process performed by the image processing device.

The image processing device (the image processing device 3, or the image processing device of the digital camera 1 or the printer device 4) reads the image file which stores the image data of the image specified by the user in step S11 when the image data is edited. Then, the image processing device performs the image editing process such as changing a parameter on the image data read, etc. at an instruction of the user in step S12, generates image editing contents information from the contents of the image editing process, etc., replaces the capture condition information with the image editing contents information, and stores the image data after the image editing process (step S13). At this time, the image data can be stored as overriding the image data of the original image stored before the image editing process, or can also be stored as respective data.

Figure 9:
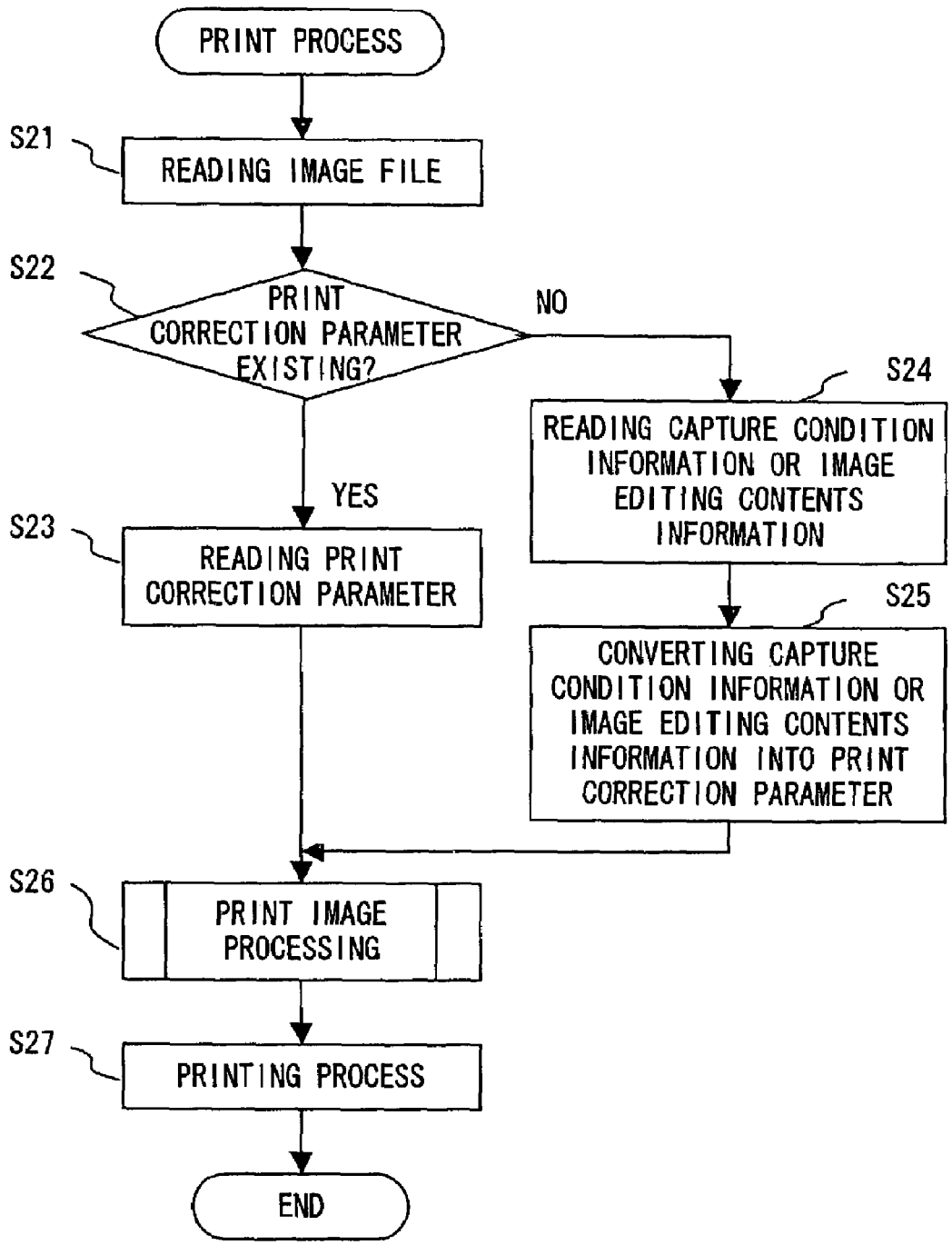
FIG. 9 is a flowchart of the printing process according to the first and second embodiments of the present invention.
Figure 10:
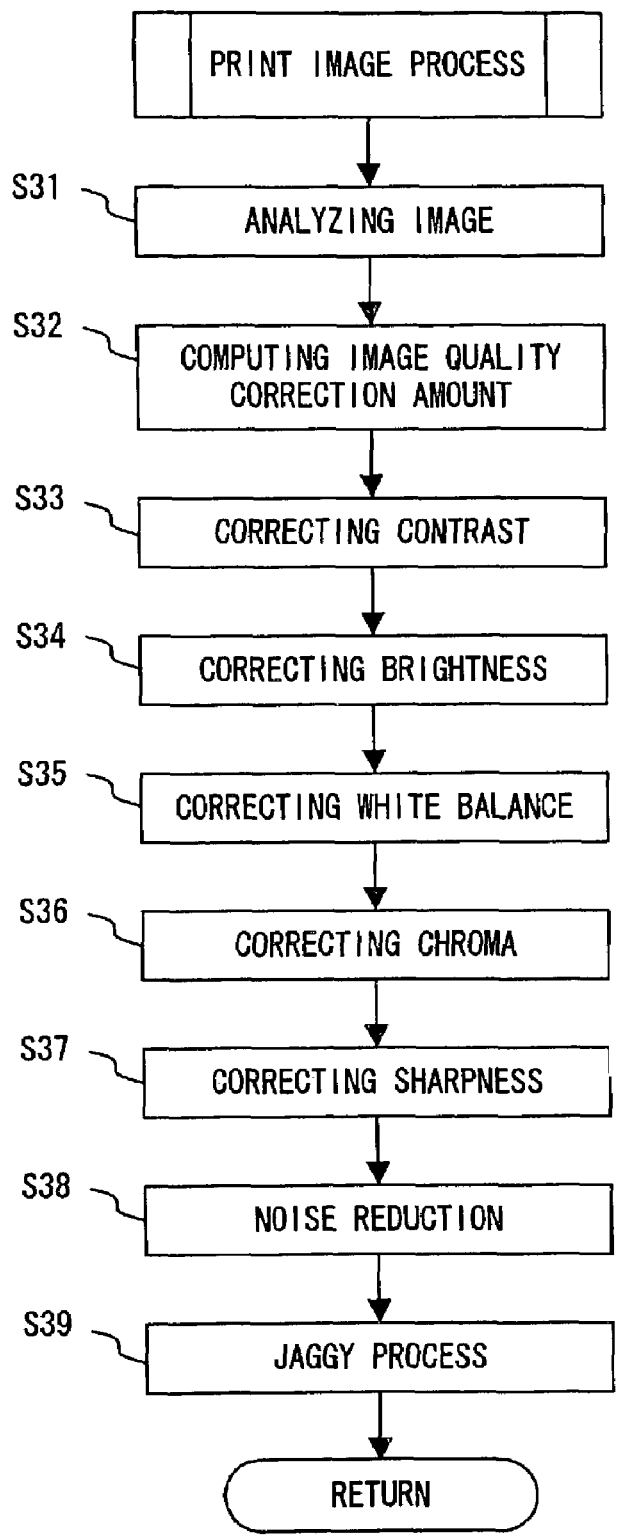
FIG. 10 is a flowchart of the details of the printing image processing.

FIGS. 9 and 10 are flowcharts of the printing process performed by the printer device 4. In the present embodiment, the process shown in FIGS. 9 and 10 can be configured such that it is performed by an application program operating on a PC.

The process shown in FIGS. 9 and 10 is described later in detail according to the second embodiment of the present invention.

Second Embodiment

According to the first embodiment, the image data is stored as associated with the capture condition information by the digital camera 1, and with the image editing contents information by the image processing device. The printer device 4 converts these informations into a print correction parameter. On the other hand, according to the second embodiment, when the image data is recorded by the digital camera 1, and when the image data is stored after performing the image editing process on the image data by the image processing device, the image data is stores as associated not with the capture condition information or the image editing contents information, but with the print correction parameter.

According to the second embodiment, when the user performs a capturing process using the digital camera 1, the digital camera 1 converts a captured image into image data. At this time, the digital camera 1 generates a print correction parameter according to the information such as various conditions during image capturing, for example, a set scene mode, the settings of the additional functions such as the presence/absence of the setting of exposure correction, etc., the operation states, etc. such as the presence/absence of the emission of strobe light, etc., and stores the parameter as associated with image data.

Therefore, when the image data is printed on the printer device 4, the print correction parameter has already been prepared. Therefore, the printer device 4 performs a printing process after performing image processing based on the print correction parameter as shown in FIG. 5. As a result, the user can obtain the optimally processed image without issuing a special instruction.

If the user performs the image editing process of adjusting image data into a desired image on the image processing device (image processing device 3 or the image processing device in the digital camera 1 or the printer device 4); a print correction parameter is generated based on the contents of the image editing process when the image data in which the image editing process such as a parameter change on brightness, chroma, contrast, etc., and the template synthesis process, etc. is reflected is stored, and the generated print correction parameter is stored as associated with the image data after the image editing process. Then, during the printing process, the printer device 4 performs a printing process after performing the image processing based on the print correction parameter associated with the image data to be printed. Therefore, the user can obtain the optimally processed printed image without issuing a special instruction, even if the user performed the image editing process of adjusting image data on the image processing device.

Thus, according to the second embodiment, since the printer device 4 does not convert capture condition information or image editing contents information into a print correction parameter, it is not necessary to prepare the capture condition information—printer correction parameter conversion table shown in FIG. 5 or the image edition contents information—printer correction parameter conversion table shown in FIG. 6. Furthermore, since no converting process is performed during printing, the printing process can be performed at a higher speed.

Figure 11:
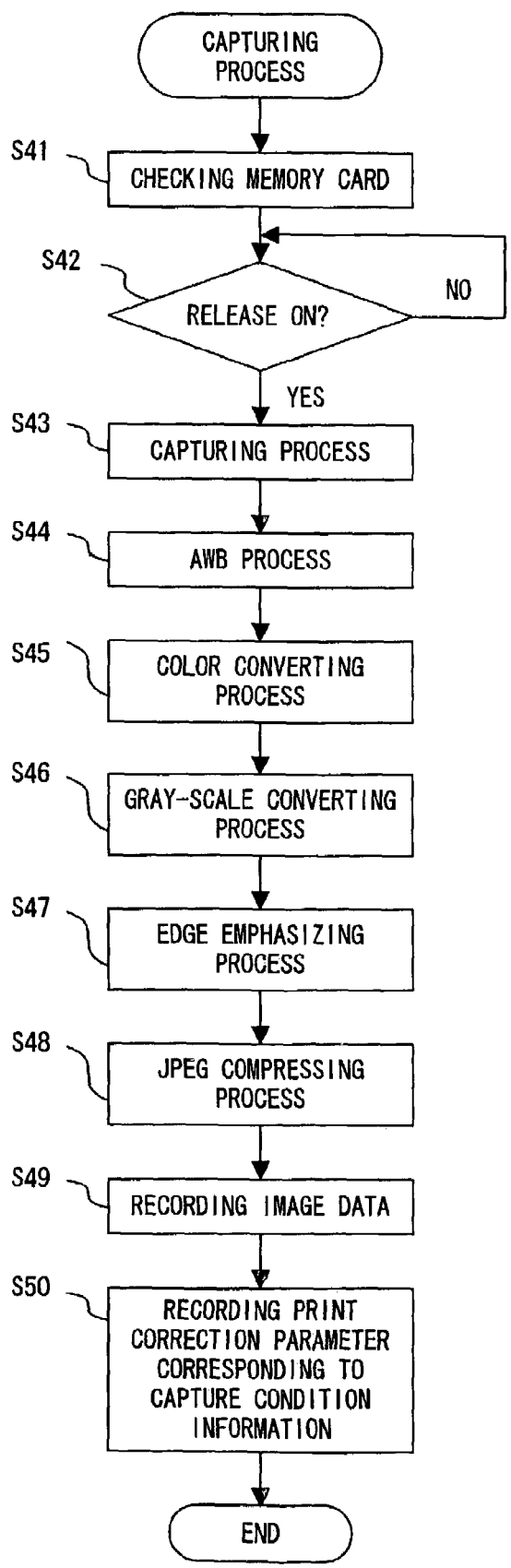
FIG. 11 is a flowchart of the capturing process according to the second embodiment of the present invention.

FIG. 11 is a flowchart of the capturing process performed by the digital camera 1 according to the second embodiment. The digital camera 1 according to the second embodiment is provided with a table for conversion of various conditions during image capturing into a print correction parameter which corresponds to the capture condition information—printer correction parameter conversion table shown in FIG. 5.

In FIG. 11, since the processes of checking a memory card to recording image data in steps S41 through S49 are the same as the processes in steps S1 through S9 in FIG. 7, the detailed explanation is omitted here.

When the image data of a captured image is stored in step S49, the digital camera 1 generates a print correction parameter according to the capture condition information indicating various conditions during image capturing such as the scene mode selected during image capturing, additional function setting information, etc., and stores it in step S50 as associated with the external device stored in step S49, thereby terminating the capturing process.

FIG. 12 is a flowchart of the image editing process performed by the image processing device according to the second embodiment of the present invention. The image-processing device according to the second embodiment is provided with a table for conversion of the contents of the image editing process performed by the user on the image data into a print correction parameter which corresponds to the image edition contents information—printer correction parameter conversion table shown in FIG. 6.

The image processing device (the image processing device 3, or the image processing device in the digital camera 1 or the printer device 4) reads an image file in which image data of an image specified by a user is recorded in step S51 as in the first embodiment when the image data is edited. Then, the image processing device performs the image editing process of changing a parameter, etc. on the read image data at an instruction of the user in step S 52. Then, in step S53, a print correction parameter is generated from the contents of the image editing process, etc., and then replaces the items in the print correction parameter associated with the original image before the image editing process which are required to be replaced based on the image editing process. At this time, the image data can overwrite the image data of the original image before the image editing process, or can be stored as respective data.

FIG. 9 is a flowchart of the printing process performed by the printer device 4 according to the second and first embodiments of the present invention. In the present embodiment, the process in FIG. 9 can be configured to be performed not by the printer device 4, but by an application program operating on a PC.

The flowchart shown in FIG. 9 corresponds to the case in which the digital camera 1 and the image processing device store the image data as associated with the capture condition information and the image editing contents information as in the first embodiment, and the case in which the image data is stored as associated with the print correction parameter as in the second embodiment.

In FIG. 9, when the printing process starts, the printer device 4 reads an image file in which image data of an image specified by the user is recorded in step S21.

Then, it is checked in step S22 whether or not the information associated with the image file read includes a print correction parameter. If there is a print correction parameter associated with thee file (YES in step S22), then the printing process is performed on the print correction parameter as having a higher priority than the capture condition information and image editing contents information, therefore, the print correction parameter is read (step S23). Furthermore, unless there is an associated print correction parameter in step S22 (NO in step S22), the capture condition information or the image editing contents information associated with the image data is read in step S24, and is converted into a print correction parameter (step S25).

Then, a print image processing is performed and print data is generated in step S26 using a print correction parameter obtained in step S23 or S25. Then, in the printing process in step S27, if the printer device 4 performs the present process, then an image is printed according to the print data. If an application program performs the present process, then the print data is transmitted to the printer device, thereby performing an image printing process.

FIG. 10 is a flowchart of the details of the print image processing in step S26 shown in FIG. 9.

In this process, the analysis of image data to be printed such as the brightness, contrast, chroma, etc. is carried out in step S31.

Then, in step S32, an amount of correction of image quality is computed with the analysis result in step S31 and the print correction parameter obtained in step S25 taken into account. Based on this, a contrast correcting process (step S33), a brightness correcting process (step S34), a white balance correcting process (step S35), a chroma correcting process (step S36), a sharpness (resolution) correcting process (step S37), a noise reduction process (step S39) for reducing noise, and a jaggy process (step S39) for reducing jaggys are performed, thereby generating print data, and returning control to step S27.

Third Embodiment

In the first embodiment, when the user intentionally performs an image editing process on the image data, the image editing contents information replaces the capture condition information associated with the image data, and is added to the image data.

However, with this configuration, the printer device 4 requires the image edition contents information—printer correction parameter conversion table in addition to the capture condition information—printer correction parameter conversion table.

On the other hand, according to the third embodiment, the image editing contents information is converted into the capture condition information matching in contents, and are stored as associated with the image data. Therefore, since the digital camera 1 and the image processing devices store the capture condition information as associated with the image data, the printer device 4 requires only the capture condition information—printer correction parameter conversion table.

The image processing device generates capture condition information based on the image editing process performed by the user when the image data of an image treated in the image editing process is stored, and stores the information as associated with the image data.

FIG. 13 is a table showing the correspondence between the contents of the image editing performed on the image data by the image processing device and the capture condition information. Some items of the image editing contents and the capture condition information are the same as the items of the capture condition information—printer correction parameter conversion table shown in FIG. 5 and the image edition contents information—printer correction parameter conversion table shown in FIG. 6. The table shown in FIG. 13 is only an example, and each item can be variable depending on the specifications of the digital camera 1 or the image processing device.

In FIG. 13, each item of the image editing contents is horizontally arranged, and each item of the capture condition information obtained by converting the image editing contents is vertically arranged. When the image processing device holds this type of table, and stores the image data treated in the image editing process, corresponding capture condition information is obtained from the image editing contents for the image data, and is stored as associated with the image data.

For example, when a parameter changing process is performed on 'contrast' in the image editing process, the item 'strobe light' is set to 'no emission yet', and the item 'contrast' is set to 'standard' in the example of the table shown in FIG. 13, and when the parameter of the contrast is increased by a predetermined value or more, the capture condition information in which the 'ISO sensitivity' is set to 'increased' is generated, and is stores as associated with the image data. Furthermore, if a 'trimming' process is performed as the capture condition information, the capture condition information in which the value obtained by multiplying the digital zoom magnification by the magnification of trimming is set in the item 'digital zoom' of the capture condition information is generated, and stored as associated with the image data.

In the third embodiment, since the digital camera 1 and the image processing device store the capture condition information as associated with the image data, the printer device 4 only requires the capture condition information—printer correction parameter conversion table, thereby simplifying the configuration of the printer device 4.

Described below is the operation process of each appliance according to the third embodiment.

According to the third embodiment, the digital camera 1 stores the data of the captured image during image capturing as associated with the capture condition information, but the processing operation is the same as in the first embodiment, and performs a process similar to that in the flowchart shown in FIG. 7. The printer device 4 equally processes the image data treated in the image editing process and the data not treated in the process. That is, as in the printing process according to the first embodiment, the capture condition information associated with the image data to be printed is converted into a print correction parameter, and the image processing is performed based on the print correction parameter, and then a printing process is performed. Therefore, the operating process of the printer device 4 according to the third embodiment is basically the same as the process shown in the flowchart in FIGS. 9 and 10.

FIG. 14 is a flowchart of the image editing process of the image processing device (image processing device 3, or the image processing device in the digital camera 1 or the printer device 4) according to the third embodiment.

As same as in the first and second embodiment, when image data is edited, the image processing device first reads in step S61 the image file in which the image data of an image specified by the user is recorded, and performs the image editing process of changing a parameter, etc. on the read image data at an instruction of the user in step S62.

When all image editing process is completed, and the image data treated in the image editing process is stored, the image processing device converts the contents of the image editing process into the capture condition information using the table as shown in FIG. 13 in step S63, replaces in step S64 the capture condition information with the capture condition information associated with the original image data before the image editing process for what is to be replace according to the contents of the image editing process. At this time the image data can overwrite the image data of the original image before the image editing process, or can be stored as another data.

Fourth Embodiment

In the fourth embodiment, the digital camera 1 and the image processing device stores the image data as associated with the print correction parameter in addition to the capture condition information and the image process editing contents information. Thus, the fourth embodiment can be applied although the printer device 4 does not have the capture condition information—printer correction parameter conversion table, or the image edition contents information—printer correction parameter conversion table, or, the digital camera 1 or the image processing device, and the printer device 4 do not have the same specifications of the print correction parameter.

FIG. 15 is a flowchart of the capturing process performed by the digital camera 1 according to the fourth embodiment. The digital camera 1 according to the fourth embodiment has a table for conversion of various conditions during image capturing into a print correction parameter which corresponds to the capture condition information—printer correction parameter conversion table shown in FIG. 5.

In FIG. 15, the processes of checking a memory card to recording the capture condition information in steps S71 through S80 are the same as those in steps S1 through S10 shown in FIG. 7, and the detailed explanation is omitted here.

When the capture condition information about the captured image is stored in step S80, the digital camera 1 uses a table for conversion of various conditions during image capturing into a print correction parameter which corresponds to the capture condition information—printer correction parameter conversion table shown in FIG. 5 to generate a print correction parameter according to the capture condition information about the image data in step S81, and stores in step S82 the generated parameter as associated with the image data stored in step S79, thereby terminating the capturing process.

Figure 16:
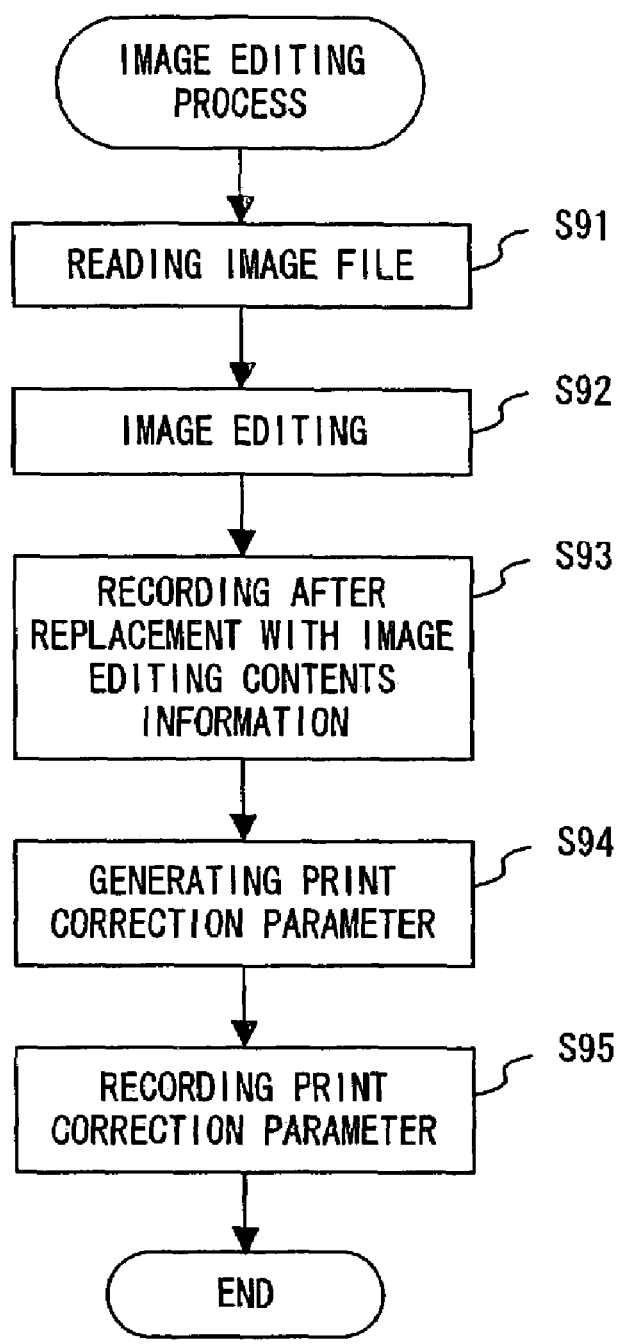
FIG. 16 is a flowchart of the image editing process according to the fourth embodiment of the present invention.

FIG. 16 is a flowchart of the image editing process of the image processing device (the image processing device 3, or the image processing device in the digital camera 1 or the printer device 4) according to the fourth embodiment. The image processing device in the fourth embodiment is provided with a table for conversion of the contents of the image process editing performed on the image data into a print correction parameter which corresponds to the image edition contents information—printer correction parameter conversion table shown in FIG. 6.

In FIG. 16, the reading process of an image file steps S91 through S93 is the same as the process in steps S11 through S13 in FIG. 8. Therefore, the detailed explanation is omitted here.

In step S93, when the image process editing contents information is stored as associated with the image data, a print correction parameter is generated form the image process editing contents information in step S94 using a table for conversion of image process editing contents into a print correction parameter which corresponds to the image edition contents information—printer correction parameter conversion table shown in FIG. 6, and the print correction parameter is stored as associated with the image data in step S95. At this time, the image data can overwrite the image data of the original image before the image editing process, or can also be stored as separate data.

Since the printing process by the printer device 4 according to the fourth embodiment is basically the same as the process in the flowchart shown in FIGS. 9 and 10, the detailed explanation is omitted here.

Fifth Embodiment

Unlike the first through fourth embodiments of the present invention, in the fifth embodiment, when the user performs an image editing process by the image processing device on the image data stored during image capturing, and the image data is intentionally treated in an adjusting edition process, the printer device 4 prints the image data as is without using the image processing. That is, when the user does not perform an intentional image processing on the image data captured by a digital camera, an image processing prepared for the printer corresponding to the type of a captured image is performed and a printing process is performed, and when the user performs an intentional image processing on the image data, the printer does not perform any image processing and the image date processed by user as-is is printed.

According to the fifth embodiment, the image data is stored as associated with a print correction process flag in addition to the capture condition information. The print correction process flag indicates whether or not an image correction is made during printing, and the printer device 4 determines whether or not the image processing is performed depending on the set value of the print correction process flag.

The print correction process flag set ON with the capture condition information is stored in the digital camera 1 as associated with the image data when the image data of the captured image is recorded. After the user performs the image editing process, in the image processing device, the print correction process flag set OFF when the image data is recorded is stored as associated with the image data. Then, the printer device 4 performs the image processing when the print correction process flag is set ON, and does not perform the image processing and performs the printing process using the image data as is when the print correction process flag is set OFF.

Figure 17:
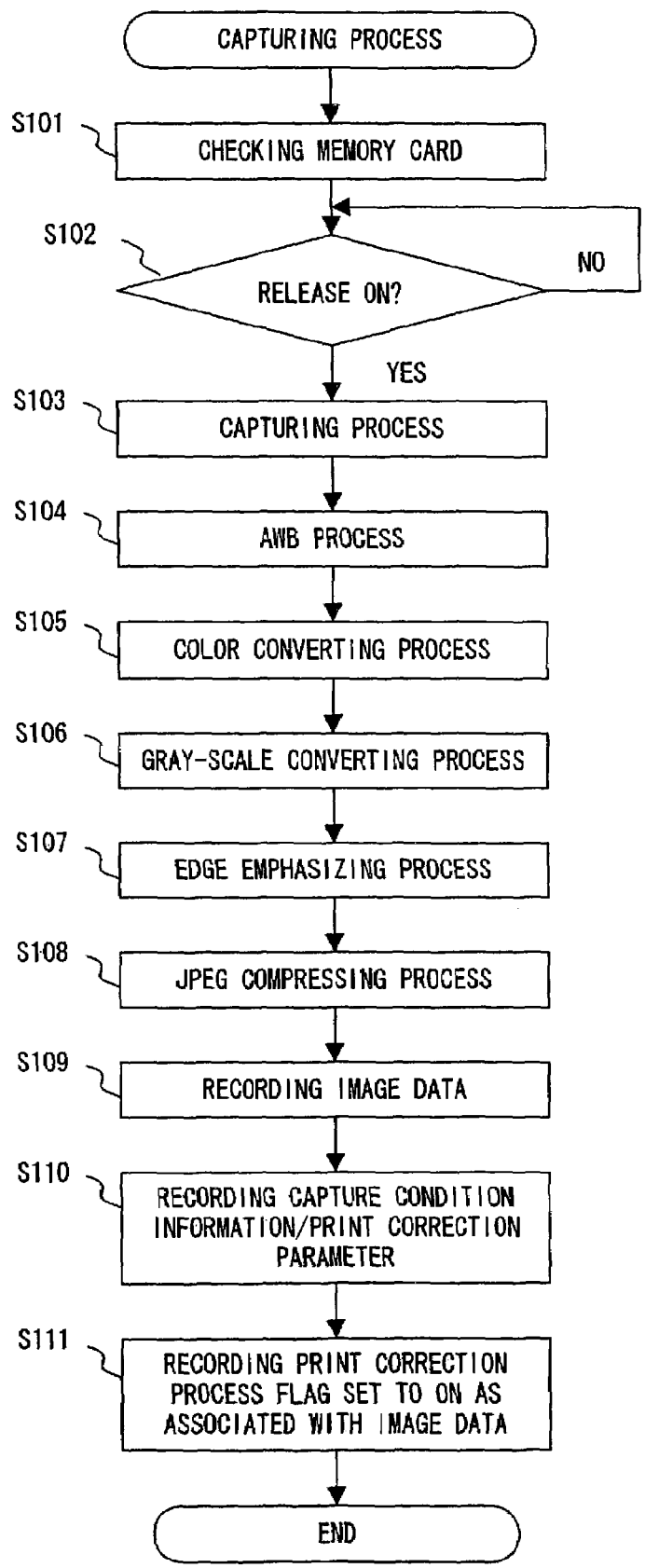
FIG. 17 is a flowchart of the capturing process according to the fifth embodiment of the present invention.

FIG. 17 is a flowchart of the capturing process performed by the digital camera 1 according to the fifth embodiment of the present invention.

In FIG. 17, since the process of checking a memory card to recording the image data in steps S101 through S109 is the same as the process from steps S1 through S9 in FIG. 7, the detailed explanation is omitted here.

In step S109, when the image data of a captured image is stored, the digital camera 1 stores in step S110 the capture condition information and/or the print correction parameter converted from the capture condition information as associated with the image data. In step S111, the print correction process flag is set to ON, and is stored as associated with the image data, thereby terminating the capturing process.

FIG. 18 is a flowchart of the image editing process performed by the image processing device according to the fifth embodiment.

When image data is edited, the image processing device (the image processing device 3, or the image processing device in the digital camera 1 or the printer device 4) reads in step S121 the image file in which the image data of an image specified by the user is recorded as in the above mentioned first through fourth embodiments. Then, in step S122, the image processing device performs the image editing process of changing a parameter, etc. on the image data read at an instruction of the user. Then, in step S123, the image data treated in the image editing process is recorded.

Then, the image processing device sets the print correction process flag in the OFF state in step S124, and records in step S125 the flag as associated with the image data recorded in step S123, thereby terminating the image editing process.

Figure 19:
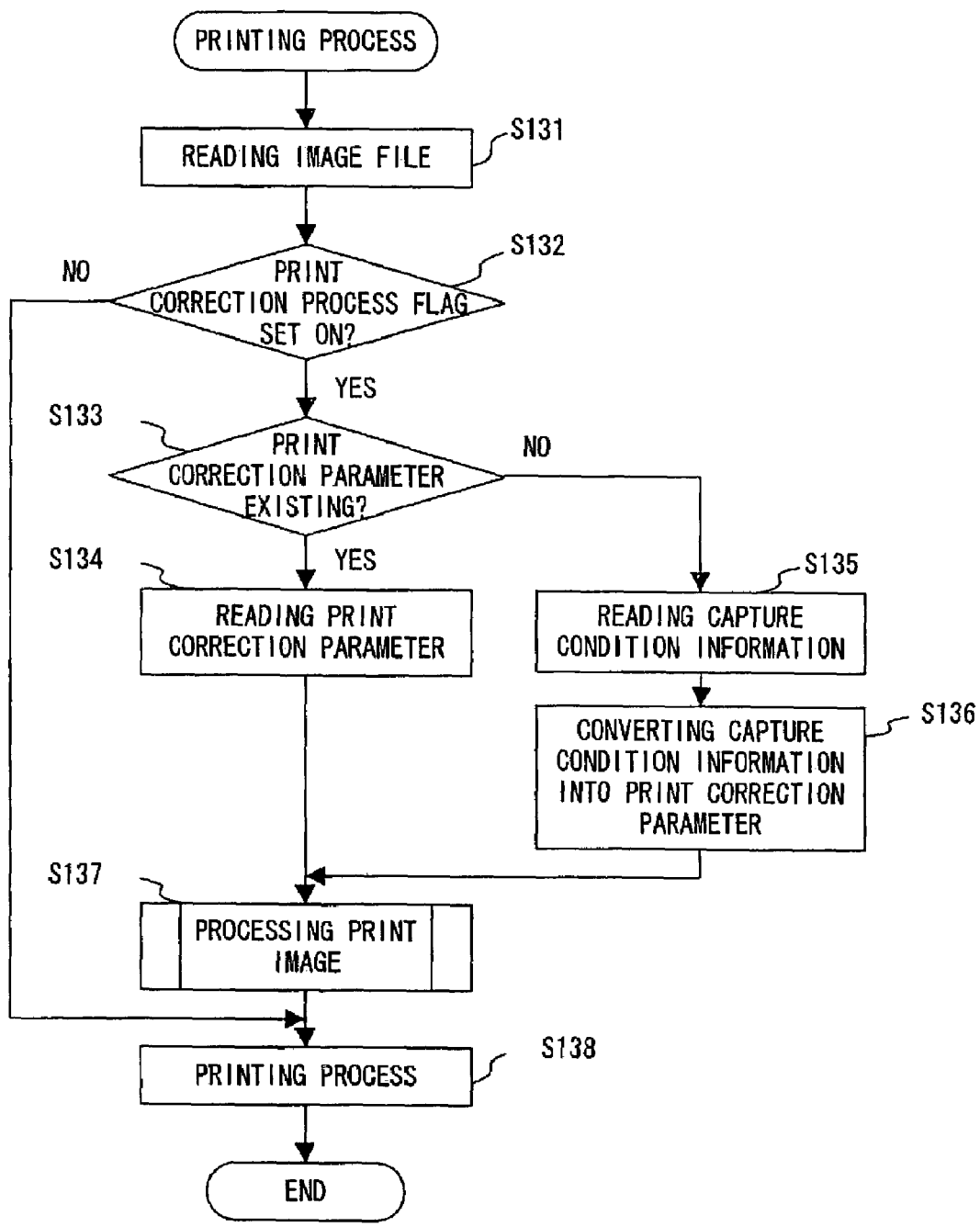
FIG. 19 is a flowchart of the printing process according to the fifth embodiment of the present invention.

FIG. 19 is a flowchart of the printing process performed by the printer device 4 according to the fifth embodiment. According to the present embodiment, the process shown in FIG. 19 is can be configured to be performed not by the printer device 4 but by the application program operating on a PC.

In FIG. 19, when the printing process starts, the printer device 4 reads in step S131 an image file in which the image data of an image specified by the user is recorded.

Then, in step S132, the print correction process flag associated with the read image file is checked. If the print correction process flag is set OFF (NO in step S132), then the image processing is not performed, control is passed to step S138, and the image data is printed.

If the print correction process flag is set ON in step S132 (YES in step S132), it is checked in step S133 whether or not the information associated with the read image file includes a print correction parameter. If the associated print correction parameter is detected (YES in step S133), then the print correction parameter is read (step S134), since the print correction parameter is used in a print process as having a higher priority than the capture condition information and the image editing contents information. If there is no assigned print correction parameter in step S133 (NO in step S133), then the capture condition information or the image editing contents information associated with the image data is read in step S135, and is converted into a print correction parameter (step S136).

Then, using the print correction parameter obtained in step S134 or S136, a print image processing is performed, and print data is generated in step S137. Then, in step S138, if the printer device 4 performs the printing process, an image is printed based on the print data. If the application program performs the printing process, the print data is transmitted to the printer device which is to print an image, thereby terminating the printing process.

Figure 20:
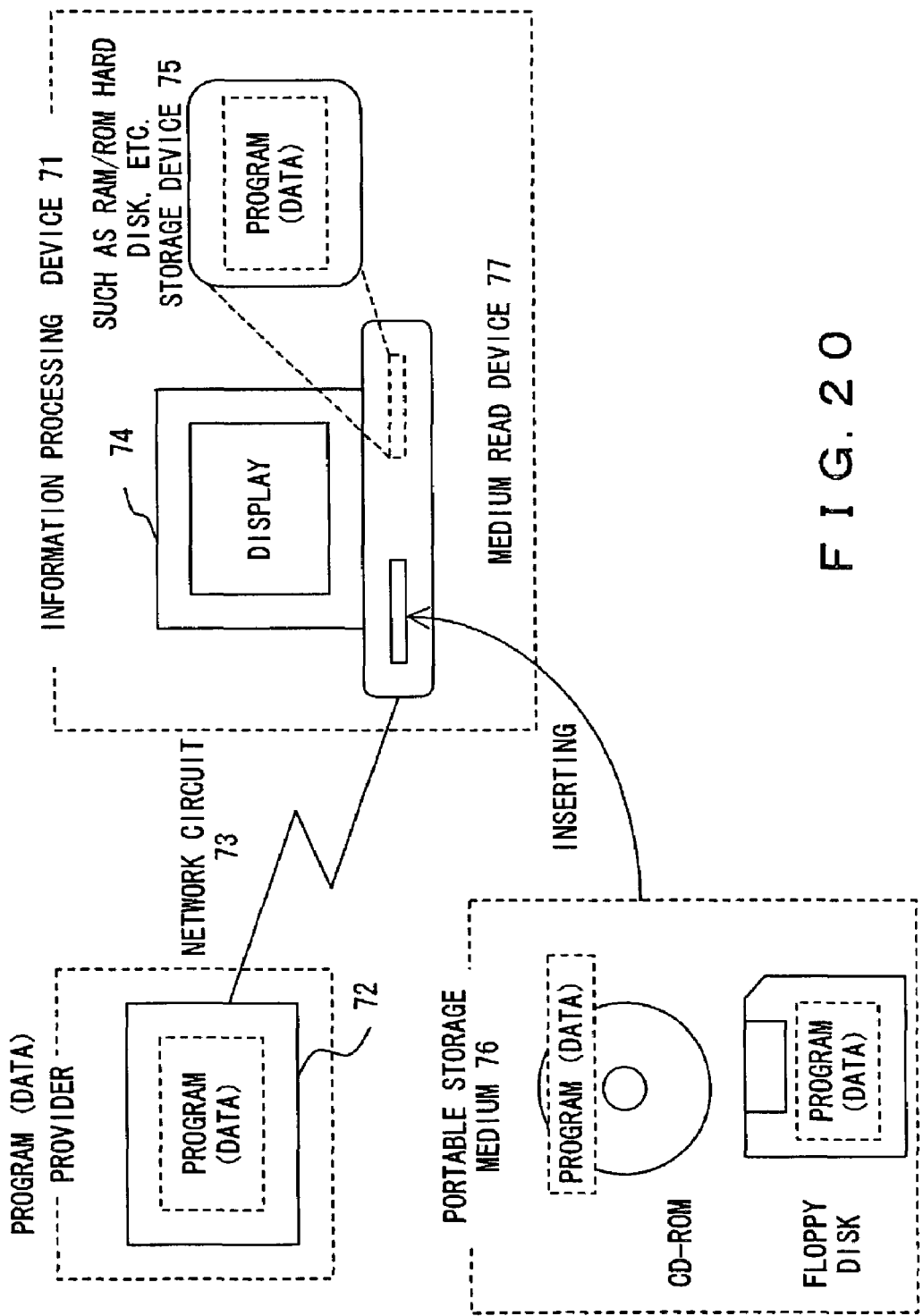
FIG. 20 shows an example of a storage medium. according to an embodiment of the present invention.

FIG. 20 shows an example of a storage medium according to the present embodiment.

In the PC shown in FIG. 4, application software can be exchanged using a storage medium 57 such as a flexible disk, etc. Therefore, the present invention is not limited to a printing system or an image processing device, but can be configured as a program used to direct a computer to perform the function of the image processing device 3 in each embodiment of the present invention, and a computer-readable storage medium 67 when the present invention is applied to the computer.

In this case, for example, the 'storage medium' can be a portable storage medium 76 attachable to and removable from a medium read device 77 such as CD-ROM, a floppy disk (or an MO, a DVD, a removable hard disk, etc.), a storage unit (database, etc.) 72 in an external device (server, etc.) communicable through a network circuit 73, a storage device (RAM or a hard disk, etc.) 75, etc. in a body 74 of an information processing device 71, etc. as shown in FIG. 20. A program stored in the portable storage medium 76 or the storage unit (database, etc.) is loaded into memory (RAM or a hard disk, etc.) 75 in the body 74 for execution.

According to the present invention, a user can obtain a printed image in the optimum state without a special instruction issued in a printing process on the image data captured by a digital camera.

In addition, although image data is treated by the user in the image editing process, the user can obtain a desired printed image without a special instruction.

What is claimed is:

1. A printing system, comprising:
    a camera unit performing an electro-optic conversion on an image from a subject, generating image data storable in a storage unit, and storing print instruction information, which is for printing operation after an image process regarding at least one of brightness, contrast, white balance, chroma, sharpness, noise reduction, and jaggy process is performed on the captured image at printing, as associated with the image data according to capture information relating to capture of the image so that a combination of the print instruction information and the image data are assigned for each image;
    an image editing unit performing image editing by performing an image process regarding at least one of brightness, contrast, color balance, chroma, sharpness, trimming, and template synthesis on the image data stored in combination with the print instruction information;
    an information rewriting unit rewriting the print instruction information stored as associated with the image data corresponding to contents of image editing by the image editing unit; and
    a printing unit performing a printing process after performing a predetermined image processing on the image data on which the imaging editing is performed, corresponding to the print instruction information rewritten by the information rewriting unit.

2. The printing system according to claim 1, further comprising a storage unit storing image data processed in image editing by the image editing unit as associated with the print instruction information rewritten by the information rewriting unit corresponding to the contents of the image editing of the image editing unit.

3. The printing system according to claim 1, wherein the capture information includes information indicating a scene mode during image capturing.

4. The printing system according to claim 1, wherein the capture information includes information indicating settings other than a main function for capturing.

5. The printing system according to claim 1, wherein the capture information indicates an operation during image capturing.

6. The printing system according to claim 1, wherein the print instruction information includes restriction instruction information for restrictions and instructions on the image processing performed by the printing unit on the image data associated with the print instruction information.

7. The printing system according to claim 6, wherein the restriction instruction information is parameter setting information including one or more parameter indicating a restriction and an instruction for each of a plurality of processes to be performed in a predetermined image processing.

8. The printing system according to claim 1, wherein the print instruction information includes at least one of information indicating a scene mode during image capturing, information indicating a setting state of an additional function other than a main function for capturing, and information indicating an operation during image capturing, and information for restrictions and instructions for the predetermined image processing performed by the printing unit on image data with which the print instruction information is associated.

9. The printing system according to claim 1, wherein the print instruction information includes the capture information, and the printing unit comprises a conversion unit for converting the capture information into parameter setting information containing one or more parameters indicating restrictions and instructions for each of a plurality of processes performed in the predetermined image processing.

10. The printing system according to claim 1, wherein the information rewriting unit rewrites the print instruction information into information indicating contents of the image editing.

11. The printing system according to claim 1, wherein the information rewriting unit rewrites the print instruction information such that the print instruction information can include information for restrictions and instructions for the predetermined image processing performed by the printing unit on the information about the contents of the image editing and the image data associated with the print instruction information.

12. The printing system according to claim 1, wherein the information rewriting unit rewrites the print instruction information such that the print instruction information can include information for restrictions and instructions for the predetermined image processing performed by the printing unit on the image data with which the print instruction information is associated.

13. The printing system according to claim 1, wherein the information rewriting unit converts information indicating the contents of the image editing into the capture information, and rewrites the print instruction information according to the capture information.

14. The printing system according to claim 1, wherein the print instruction information includes print correction process information indicating whether or not image editing is performed by the image editing unit on the image data.

15. The printing system according to claim 1, wherein the information rewriting unit rewrites the print instruction information such that the print instruction information can include the information indicative of suppression of a process on a specific parameter on which the image editing unit performs the image editing in the predetermined image processing.

16. The printing system according to claim 15, wherein the specific parameter is a mixing ratio of color elements configuring an image.

17. The printing system according to claim 15, wherein the specific parameter is at least one of brightness, a gray scale, and chroma.

18. The printing system according to claim 1, wherein the capture information includes information indicating a scene mode during image capturing, information indicating the state of setting a additional function other than a main function for capturing and information indicating an operation during image capturing and the information rewriting unit rewrites the print instruction information after converting the capture information into restriction instruction information for restrictions and instructions for the predetermined image processing performed by the printing unit on the image data associated with the print instruction information.

19. The printing system according to claim 18, wherein the restriction instruction information is parameter setting information including one or more parameter indicative of restrictions and instructions for each of a plurality of processes performed in the predetermined image processing.

20. An image processing device, comprising:
an image editing unit adapted to perform image editing operations on image data obtained by performing and electro-optic conversion on an image from a subject and stored in association with print instruction information generated according to capture of the image for each image, wherein the image editing operations include performing an image process regarding at least one of brightness, contrast, color balance, chroma, sharpness, trimming, and template synthesis on the captured image, and wherein the printing instruction information is for a printing operation after the image process is performed on the captured image at printing;
an information rewriting unit adapted to rewrite the print instruction information stored in association with the image data to generate rewritten print instruction information based on at least on of (A) the captured information relating to capture of the image and (B) the image editing operations performed by the image editing unit on the image data; and
a storage unit storing the rewritten print instruction information generated by the information rewritten unit in association with the image data on which the image editing is performed.

21. The image processing device according to claim 20, wherein
the print instruction information indicates restrictions and instructions for predetermined image processing performed when the image data is printed.

22. The image processing device according to claim 20, wherein
the capture information includes information indicating a scene mode during image capturing.

23. The image processing device according to claim 20, wherein
the capture information includes information indicating settings other than a main function for capturing.

24. The image processing device according to claim 20, wherein
the capture information indicates an operation during image capturing.

25. The image processing device according to claim 20, wherein
the print instruction information includes restriction instruction information for restrictions and instructions on the image processing performed when printing image data associated with the print instruction information.

26. The image processing device according to claim 25, wherein
the restriction instruction information is parameter setting information including one or more parameter indicating a restriction and an instruction for each of a plurality of processes to be performed in a predetermined image processing performed when a printing process is performed.

27. The image processing device according to claim 20, wherein
the print instruction information includes at least one of information indicating a scene mode during image capturing, information indicating a setting state of an additional function other than a main function for capturing, and information indicating an operation during image capturing, and information for restrictions and instructions for the predetermined image processing performed when image data with which the print instruction information is associated is printed.

28. The image processing device according to claim 20, wherein
the information rewriting unit rewrites the print instruction information into information indicating contents of the image editing.

29. The image processing device according to claim 20, wherein
the information rewriting unit rewrites the print instruction information such that the print instruction information can include information for restrictions and instructions for the predetermined image processing performed during printing on the information about the contents of the image editing and the image data associated with the print instruction information.

30. The image processing device according to claim 20, wherein
the information rewriting unit rewrites the print instruction information such that the print instruction information can include information for restrictions and instructions for the predetermined image processing performed during printing on the image data with which the print instruction information is associated.

31. The image processing device according to claim 20, wherein
the information rewriting unit converts information indicating the contents of the image editing into the capture information, and rewrites the print instruction information according to the capture information.

32. The image processing device according to claim 20, wherein
the print instruction information includes print correction process information indicating whether or not image editing is performed by the image editing unit on the image data.

33. The image processing device according to claim 20, wherein
the information rewriting unit rewrites the print instruction information such that the print instruction information can include the information indicative of suppression of a process on a specific parameter on which the image editing unit performs the image editing in the predetermined image processing during printing.

34. The image processing device according to claim 33, wherein
the specific parameter is a mixing ratio of color elements configuring an image.

35. The image processing device according to claim 33, wherein
the specific parameter is at least one of brightness, a gray scale, and chroma.

36. The image processing device according to claim 20, wherein
the capture information includes information indicating a scene mode during image capturing, information indicating the state of setting a additional function other than a main function for capturing and information indicating an operation during image capturing, and the information rewriting unit rewrites the print instruction information after converting the capture information into restriction instruction information for restrictions and instructions for the predetermined image processing performed by the printing unit on the image data associated with the print instruction information.

37. The image processing device according to claim 36, wherein
the restriction instruction information is parameter setting information including one or more parameter indicative of restrictions and instructions for each of a plurality of processes performed in the predetermined image processing.

38. A printing system, comprising:
camera means for performing an electro-optic conversion on an image from a subject, generating image data storable in storage means, and storing print instruction information, which is for printing operation after an image process regarding at least one of brightness, contrast, white balance, chroma, sharpness, noise reduction, and jaggy process is performed on the captured image at printing, as associated with the image data according to capture information relating to capture of the image so that a combination of the print instruction information and the image data are assigned for each image;
image editing means for performing image editing by performing an image process regarding at least one of brightness, contrast, color balance, chroma, sharpness, trimming, and template syntheses on the image data stored in combination with the print instruction information;
information rewriting means for rewriting the print instruction information stored as associated with the image data corresponding to contents of image editing by the image editing means; and
printing means for performing a printing process after performing a predetermined image processing on the image data on which the image editing is performed, rewritten by the information rewriting unit corresponding to the print instruction information.

39. An image processing device, comprising:

image editing means for performing image editing by performing an image process regarding at least one of brightness, contrast, color balance, chroma, sharpness, trimming, and template synthesis on image data storable in storage means after being obtained by performing an electro-optic conversion on an image from a subject and on image data stored in combination with print instruction information, which is for printing operation after an image process regarding at least one of the brightness, contrast, white balance, chroma, sharpness, noise reduction, and jaggy process is performed on the captured image at printing, generated according to capture information relating to capture of the image for each image;

information rewriting means for rewriting print instruction information according to capture information relating to capture of the image data stored as associated with the image data corresponding to the contents of the image editing by the image editing means; and storage means storing print instruction information rewritten by the information rewriting unit in combination with the image data on which the image editing is performed.

40. A printing method, comprising:

performing an electro-optic conversion on an image from a subject, generating image data storable in storage unit, and storing print instruction information, which is for printing operation after an image process regarding at least one of brightness, contrast, white balance, chroma, sharpness, noise reduction, and jaggy process is performed on the captured image at printing, as associated with the image data according to capture information relating to capture of the image so that a combination of the print instruction information and the image data are assigned for each image;

performing image editing by performing an image process regarding at least one of brightness, contrast, color balance, chroma, sharpness, trimming, and template synthesis on the image data stored in combination with the print instruction information;

rewriting the print instruction information stored as associated with the image data corresponding to contents of image editing; and performing a printing process after performing a predetermined image processing on the image data on which the image editing is performed, corresponding to the print instruction information rewritten by the information rewriting unit.

41. The method according to claim 40, further comprising storing image data processed in image editing as associated with the print instruction information rewritten corresponding to the contents of the image editing.

42. The method according to claim 40, wherein the print instruction information includes information for restrictions and instructions on the image processing performed on the image data associated with the print instruction information.

43. An image processing method, comprising:

performing image editing by performing an image process regarding at least one of brightness, contrast, color balance, chroma, sharpness, trimming, and template synthesis on image data storable in a storage unit after being obtained by performing an electro-optic conversion on an image from a subject and on image data stored in combination with print instruction information, which is for printing operation after an image process regarding at least one of brightness, contrast, white balance, chroma, sharpness, noise reduction, and jaggy process is performed on the captured image at printing, generated according to capture information relating to capture of the image for each image;

rewriting print instruction information according to capture information relating to capture of the image data stored as associated with the image data corresponding to the contents of the image editing; and storing print instruction information rewritten by the information rewriting unit in combination with the image data on which the image editing is performed.

44. The method according to claim 43, wherein the print instruction information includes information for restrictions and instructions on the image processing performed on the image data associated with the print instruction information.

45. A computer-readable portable storage medium storing a program used to direct a computer to perform:

performing image editing by performing an image process regarding at least one of brightness, contrast, color balance, chroma, sharpness, trimming, and template synthesis on image data storable in a storage unit after being obtained by performing an electro-optic conversion on an image from a subject and on image data stored in combination with print instruction information, which is for printing operation after an image process regarding at least one of brightness, contrast, white balance, chroma, sharpness, noise reduction, and jaggy process is performed on the captured image at printing, generatad according to capture information relating to capture of the image for each image;

rewriting print instruction information according to capture information relating to capture of the image data stored as associated with the image data corresponding to the contents of the image editing; and storing print instruction information rewritten by the information rewriting unit in combination with the image data on which the image editing is performed.

* * * * *